US010885118B2

(12) United States Patent
Fan et al.

(10) Patent No.: US 10,885,118 B2
(45) Date of Patent: Jan. 5, 2021

(54) INCREMENTAL GRAPH COMPUTATIONS FOR QUERYING LARGE GRAPHS

(71) Applicant: Futurewei Technologies, Inc., Plano, TX (US)

(72) Inventors: Wenfei Fan, Wayne, PA (US); Chunming Hu, Beijing (CN); Chao Tian, Edinburgh (GB); Yu Chen, San Jose, CA (US); Demai Ni, Danville, CA (US)

(73) Assignee: Futurewei Technologies, Inc., Plano, TX (US)

( * ) Notice: Subject to any disclaimer, the term of this patent is extended or adjusted under 35 U.S.C. 154(b) by 246 days.

(21) Appl. No.: 15/971,524

(22) Filed: May 4, 2018

(65) Prior Publication Data
US 2018/0330008 A1 Nov. 15, 2018

Related U.S. Application Data

(60) Provisional application No. 62/505,689, filed on May 12, 2017.

(51) Int. Cl.
*G06F 16/901* (2019.01)
*G06F 9/448* (2018.01)
*G06F 16/903* (2019.01)

(52) U.S. Cl.
CPC ........ *G06F 16/9024* (2019.01); *G06F 9/4498* (2018.02); *G06F 16/90335* (2019.01)

(58) Field of Classification Search
None
See application file for complete search history.

(56) References Cited

U.S. PATENT DOCUMENTS

2010/0010952 A1\* 1/2010 Kuhn ..................... G06Q 10/04 706/47
2014/0172939 A1\* 6/2014 McSherry ......... H04L 29/08135 709/201
2015/0081741 A1 3/2015 Xu
(Continued)

FOREIGN PATENT DOCUMENTS

CN 101566988 A 10/2009

OTHER PUBLICATIONS

Foreign Communication From a Counterpart Application, European Application No. 18797983.6, Extended European Search Report dated Jan. 24, 2020, 7 pages.
(Continued)

*Primary Examiner* — Richard L Bowen
(74) *Attorney, Agent, or Firm* — Conley Rose, P.C.

(57) ABSTRACT

A mechanism of updating query results for a graph linking data in a computer system is disclosed. Results of the query on the graph linking data are received along with a change to the graph. The change to the graph is determined to be localizable or relatively bounded. Based on the determination of the localizable or relatively bounded change to the graph, the results of the query are updated based on the change to the graph without determining updated results of the query over the graph. This is accomplished by discovering nodes that are affected by the change to the graph, updating data associated with the affected nodes, and applying the updated data to the results of the query.

20 Claims, 5 Drawing Sheets

(56) References Cited

U.S. PATENT DOCUMENTS

| | | | |
|---|---|---|---|
| 2015/0142796 A1* | 5/2015 | Floreskul | G06F 17/10 |
| | | | 707/736 |
| 2015/0186427 A1 | 7/2015 | Logothetis et al. | |
| 2015/0363461 A1 | 12/2015 | Behal et al. | |
| 2017/0300593 A1* | 10/2017 | Inoue | G06F 16/2372 |
| 2018/0032587 A1* | 2/2018 | Abdelhamid | G06F 16/9024 |

OTHER PUBLICATIONS

Machine Translation and Abstract of Chinese Publication No. CN101566988, Oct. 28, 2009, 22 pages.

Fan, W., et al., "Incremental Graph Computations: Doable and Undoable," SIGMOD, May 14-19, 2017, 15 pages.

Foreign Communication From a Counterpart Application, PCT Application No. PCT/CN2018/085757, English Translation of International Search Report dated Aug. 9, 2018, 4 pages.

* cited by examiner

Gc

G'c

INCREMENTAL GRAPH COMPUTATIONS FOR QUERYING LARGE GRAPHS

CROSS-REFERENCE TO RELATED APPLICATIONS

This patent application claims the benefit of U.S. Provisional Patent Application No. 62/505,689, filed May 12, 2017, by Wenfei Fan, et al., and titled "Incremental Graph Computations For Querying Large Graphs," which is hereby incorporated in its entirety.

BACKGROUND

Searching big datasets can be computationally intensive and time consuming. For example, social media data may be linked according to a very large graph structure. To further complicate matters, such big datasets constantly change in both node values and node connectivity. Accordingly, some processes may be automated to search the same dataset repeatedly to obtain the most up to date data. Such processes are extremely computationally intensive as the big dataset is searched over and over again. For example, a search can be run on the dataset and search results obtained by a search algorithm. The dataset may then undergo an update. The update may render the results of the search at least partially invalid. The search can then be run again on the updated dataset to obtain more recent/accurate results. The search algorithm may require that the entire dataset be searched again, regardless of the size of the dataset update. In such a case, the computational complexity of the search, which is expressed in terms of computational resource usage and/or time to completion, is based on the size of the dataset. As such, the computational cost of performing such a search depends on the size of the graph, the frequency of the dataset updates, and/or the frequency of reapplication of the search algorithm. This is especially burdensome when big datasets with high update frequencies are involved.

SUMMARY

In an embodiment, the disclosure includes a computer implemented method comprising: receiving results of a query on a graph linking data; receiving a change to the graph; determining that the change to the graph is localizable or relatively bounded; and based on the determination of the localizable or relatively bounded change to the graph, updating the results of the query based on the change to the graph without determining updated results of the query over the graph by: discovering nodes that are affected by the change to the graph, updating data associated with the affected nodes, and applying the updated data to the results of the query.

Optionally, in any of the preceding aspects, another implementation of the aspect provides, wherein the change to the graph is localizable when the change to the graph can be determined by inspecting only graph nodes within a specified number of hops of any graph node indicated by the received change to the graph.

Optionally, in any of the preceding aspects, another implementation of the aspect provides, wherein the change to the graph is localizable when the query is a key word search (KWS), pattern matching via subgraph isomorphism (ISO), or combinations thereof.

Optionally, in any of the preceding aspects, another implementation of the aspect provides, wherein the query is a key word search (KWS), and updating the results of the query includes: determining when the change to the graph alters a shortest path for a query match; propagating the change to each altered shortest path within a specified bound; updating a distance value for a corresponding node for each altered shortest path; and updating the query match based on the updated distance values.

Optionally, in any of the preceding aspects, another implementation of the aspect provides, wherein the query is a key word search (KWS), and updating the results of the query includes: identifying graph nodes affected with respect to each keyword due to the change to the graph within a specified bound of the change; inserting the affected graph nodes into a queue based on keyword and potential distance values; determining when any graph node insertion into the queue creates a shorter path within the specified bound and update potential distance values in the queue; and updating the results of the query based on the queue.

Optionally, in any of the preceding aspects, another implementation of the aspect provides, wherein the query is a pattern matching via subgraph isomorphism (ISO), and updating the results of the query includes: determining a set of all edge deletions and edge insertions by the change to the graph; for each edge deletion, removing matches including the corresponding deleted edge by inspecting neighbor graph nodes of graph nodes on the deleted edge within a diameter of the query; for each edge insertion, extracting a union of neighbor graph nodes of graph nodes on the inserted edge within a diameter of the query; and determining the change to the query results based on edge changes.

Optionally, in any of the preceding aspects, another implementation of the aspect provides, wherein the change to the graph is relatively bounded when a cost of an incremental change is expressed as a polynomial function in terms of the change to the graph, a query size, and a change in an affected area of the query caused by the change to the graph.

Optionally, in any of the preceding aspects, another implementation of the aspect provides, wherein the change to the graph is relatively bounded when the query is a regular path query (RPQ), a search of strongly connected components (SCC), or combinations thereof.

Optionally, in any of the preceding aspects, another implementation of the aspect provides, wherein the query is a regular path query (RPQ), and updating the results of the query includes: receiving a nondeterministic finite automaton (NFA) describing the query; examining nodes adjacent to edges included in the change to the graph; placing nodes affected by the change to the graph into a queue; and applying the NFA to the nodes in the queue to update results of the query.

Optionally, in any of the preceding aspects, another implementation of the aspect provides, wherein the query is a search of strongly connected components (SCC), and updating the results of the query includes: determining a contracted graph containing a node for each SCC in the results of the query; when the change to the graph includes an insertion, updating only nodes corresponding to SCCs including a portion of the insertion resulting in a updated contracted graph; when the change to the graph includes a deletion, updating only nodes corresponding to SCCs including a portion of the deletion resulting in the updated contracted graph; and employing the updated contracted graph to update the results of the query.

In an embodiment, the disclosure includes a network device comprising: a memory configured to: store results of a query on a graph linking data; and store a change to the graph; and a processor coupled to the memory, the processor is configured to: determine that the change to the graph is localizable or relatively bounded; and based on the determination of the localizable or relatively bounded change to the graph, update the results of the query based on the change to the graph without determining updated results of the query over the graph by: discovering nodes that are affected by the change to the graph, updating data associated with the affected nodes, and applying the updated data to the results of the query.

Optionally, in any of the preceding aspects, another implementation of the aspect provides, wherein the change to the graph is localizable when the change to the graph can be determined by inspecting only graph nodes within a specified number of hops of any graph node indicated by the received change to the graph.

Optionally, in any of the preceding aspects, another implementation of the aspect provides, wherein the change to the graph is localizable when the query is a key word search (KWS), pattern matching via subgraph isomorphism (ISO), or combinations thereof.

Optionally, in any of the preceding aspects, another implementation of the aspect provides, wherein the change to the graph is relatively bounded when a cost of an incremental change is expressed as a polynomial function in terms of the change to the graph, a query size, and a change in an effected area of the query caused by the change to the graph.

Optionally, in any of the preceding aspects, another implementation of the aspect provides, wherein the change to the graph is relatively bounded when the query is a regular path query (RPQ), a search of strongly connected components (SCC), or combinations thereof.

In an embodiment, the disclosure includes a non-transitory computer readable medium comprising a computer program product for use by a network device, the computer program product comprising computer executable instructions stored on the non-transitory computer readable medium such that when executed by a processor cause the network device to: receive results of a query on a graph linking data; receive a change to the graph; determine that the change to the graph is localizable or relatively bounded; and based on the determination of the localizable or relatively bounded change to the graph, update the results of the query based on the change to the graph without determining updated results of the query over the graph by: discovering nodes that are affected by the change to the graph, updating data associated with the affected nodes, and applying the updated data to the results of the query.

Optionally, in any of the preceding aspects, another implementation of the aspect provides, wherein the change to the graph is localizable when the change to the graph can be determined by inspecting only graph nodes within a specified number of hops of any graph node indicated by the received change to the graph.

Optionally, in any of the preceding aspects, another implementation of the aspect provides, wherein the change to the graph is localizable when the query is a key word search (KWS), pattern matching via subgraph isomorphism (ISO), or combinations thereof.

Optionally, in any of the preceding aspects, another implementation of the aspect provides, wherein the change to the graph is relatively bounded when a cost of an incremental change is expressed as a polynomial function in terms of the change to the graph, a query size, and a change in an affected area of the query caused by the change to the graph.

Optionally, in any of the preceding aspects, another implementation of the aspect provides, wherein the change to the graph is relatively bounded when the query is a regular path query (RPQ), a search of strongly connected components (SCC), or combinations thereof.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a mechanism for updating query results for a graph linking arbitrarily large amounts of data. Specifically, the mechanism supports updating query results based on a graph update without running the query over the entire graph. This results in a query update that operates on the order of the size of the graph update and not on the order of size of the graph. This may be advantageous as the size of graph updates, for example on Internet social media systems, may be significantly smaller than the size of the underlying graph. For example, such graphs may constantly receive small changes, and hence the query results can be quickly updated without re-running the query over the entire graph each time such a change occurs. This results in faster processing times and allows the queries to operate using fewer processing resources. The mechanism first determines that the graph update is localizable and/or relatively bounded. If so, the mechanism can perform an incremental update of the query results. The graph update is localizable when the update to the graph can be determined by inspecting only graph nodes within a specified number of hops of any graph node indicated by the graph change. The graph update is relatively bounded when a cost of an incremental update to the graph can be expressed as a polynomial function in terms of the change to the graph, the query size, and a change in an affected area of the query caused by the change to the graph. Such incremental updates to the query can be employed when the query is a key word search (KWS), a pattern matching via subgraph isomorphism (ISO), a regular path query (RPQ), and/or a search of strongly connected components (SCC) based on corresponding algorithms as discussed in detail in the sections below.

Figure 1:
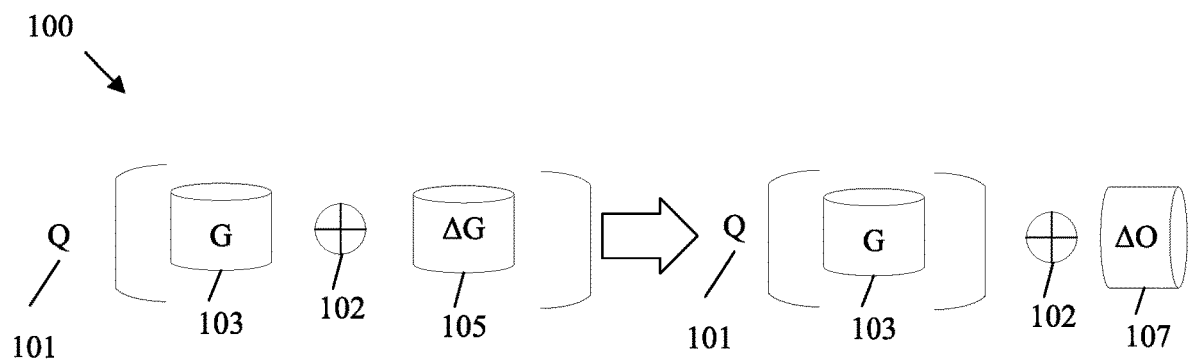
FIG. 1 is a schematic diagram of an example of an incremental search query.

FIG. 1 is a schematic diagram of an example of an incremental search query 100. Specifically, a query 101 can be applied to a graph 103 of a dataset. The dataset can be any form of relational data. The data can hence be represented, from a database storage standpoint, as a graph 103. In a graph 103, the data elements are represented as nodes and relationships between data elements are represented as links. For example, in a social media context, a group of users may be represented as graph 103 nodes. When users elect to be related in the system as friends, such friend relationships are denoted as links between the nodes of the associated users. In a social media network, a large number of users may be present, and hence the graph 103 may include an arbitrarily large number of nodes. Such users may change their personal profile data (e.g., address, current status, employer, etc.) at will, and hence the node values of graph 103 may change arbitrarily and continuously from the perspective of the searching system. Further, users may add friends, remove friends, join groups, leave groups, etc. Accordingly, the links representing such relationships may change arbitrarily and continuously from the perspective of the searching system. Such changes/updates to the graph 103 can be denoted as a graph change ($\Delta G$) 105. The $\Delta G$ 105 can be applied 102 to the graph 103 to result in a current dataset state denoted as $G \oplus \Delta G$. A query 101 can be applied to the dataset to determine node values and/or relationship links. A query 101 is any information retrieval request.

The most straightforward way to answer a query 101 is to apply 102 the $\Delta G$ 105 to the graph 103, and run the query 101 onto the result. However, in many cases, $\Delta G$ 105 may be relatively small compared to the size of the graph 103. For example, a user, in a dataset of several million users, may update that user's address. Hence, one approach to perform the query 101 would be to update the address as a $\Delta G$ 105 to the graph 103 and run the query 101 over the updated graph 103. When the query 101 has already been run on the graph 103, the previous query 101 results may be similar to the results to the query 101 over the updated graph. However, the run time of the query 101 in such a scenario is related to the size of the graph 103 (as the entire graph 103 is searched again) and is not related to the size of $\Delta G$ 105. As such, a query 101 over a big dataset represented by a graph 103 when an update $\Delta G$ 105 is applied 102 may take significant computational resources (e.g., to search several million nodes for all users) even when $\Delta G$ 105 is a relatively small change.

An alternative approach is also shown. The same results can be determined by running the query 101 over the graph 103, determining the change in output ($\Delta O$) 107 caused by the graph update, and applying 102 the $\Delta O$ 107 to the results of the query 101 over the graph 103. $\Delta O$ 107 indicates the change in results of a query 101 caused by a graph change 105. From a hardware standpoint, the query 101 results over the graph 103 can be stored in memory. Then the query 101 can be run over $\Delta G$ 105 to obtain $\Delta O$ 107. The results can then be applied 102 back to the results of the query 101 as stored in memory. This approach allows the query 101 to run once over the graph 103, and then run repeatedly over the graph changes 105 to obtain $\Delta O$ 107. Accordingly, query 101 employs a set of resources based on the size of $\Delta G$ 105 and not based on the size of the graph 103. This can save significant resources when the size of $\Delta G$ 105 is small relative to the size of the graph 103.

The latter approach can be employed and still obtain the same results when $\Delta G$ 105 is localizable and/or relatively bounded. A graph update/change (e.g., $\Delta G$ 105) is localizable when the update to the graph 103 can be determined by inspecting only graph 103 nodes within a specified number of hops of any graph 103 node indicated by the graph change 105. The number of hops (e.g., links) can be specified as a threshold value by default and/or by user input. For example, an update to a node may cause updates in adjacent nodes, and such updates to adjacent nodes may cause further updates to further nodes, etc. In such a case, the update is not localizable when such changes propagate beyond the specified number of links/hops in the graph 103. When this cascade of changes does not occur or does not exceed the specified number of hops, the $\Delta G$ 105 is localizable. A graph update/change (e.g., $\Delta G$ 105) is relatively bounded when a cost of an incremental update to the graph (e.g., in computational resources) can be expressed as a polynomial function in terms of the change to the graph (e.g., $\Delta G$ 105), the query 101 size, and a change in an affected area of the query caused by the change to the graph (e.g., $\Delta O$ 107).

The present disclosure includes examples showing that queries 101 based on KWS, ISO, RPQ, and/or SCC can be determined to be localizable and/or relatively bounded. A KWS is a search for one or more terms that have a specific meaning in a particular context. A KWS query 101 allows a graph 103 of a dataset to be searched for one or more terms. The KWS query 101 returns one or more nodes or links in the graph 103 that are related to the search terms. The KWS may also include a bound. A bound is an integer value that indicates a maximum search distance that should be employed when a node is changed by $\Delta G$ 105. Specifically, when a node is changed, a search engine applying the query 101 should search the nodes within a number of hops from the changed node as specified by the bound. The bound may be received from a user, and the bound can ensure the $\Delta G$ 105 is considered relatively bounded. The search engine can also ensure the $\Delta G$ 105 is localizable. If so, the KWS query 101 can be applied to determine $\Delta O$ 107 and the results employed to update previously cached results instead of applying the KWS query 101 to the entire graph 103.

Various incremental KWS queries are discussed in the sections below. For example, an algorithm IncKWS+ can be employed when $\Delta G$ 105 includes an edge/node insertion and algorithm IncKWS– can be employed when $\Delta G$ 105 includes an edge/node deletion. Also disclosed is an incremental KWS algorithm with batch updates denoted as IncKWS. A batch KWS makes several incremental updates $\Delta G$ 105 to the graph 103. Such algorithms are discussed in detail below, but generally operate as follows. The IncKWS algorithms determine when the change to the graph $\Delta G$ 105 alters a shortest path for a query 101 match stored as a result of query 101 over the graph 103. The change can create a new shortest path in the case of an edge/node insertion or can remove a current shortest path in the case of an edge/ node deletion. The change is then propagated to each altered shortest path within a specified bound. The bound may be received from a user or may be predefined. KWS maintains distance values for the shortest paths between nodes matched by the query 101. Accordingly, the distance value is updated for a corresponding node for each altered shortest path. Then, the query match is updated based on the updated distance values. The preceding functionality can be implemented by employing queues. The IncKWS algorithms identify graph nodes affected with respect to each keyword, where such affect is caused due to a change to the graph ΔG 105 within the specified bound of the change. The affected graph nodes are inserted into one or more queues based on keyword and potential distance values. The IncKWS algorithms also determines when inserting a graph node into a queue creates/removes a shortest path within the bound. When this occurs, IncKWS updates the potential distance values for nodes in the queue. The results of the query are then updated based on the queue(s).

An ISO query receives two graphs. The ISO query then determines whether a first graph contains a sub-graph that is isomorphic to the second graph. A pair of graphs/sub-graphs are isomorphic when a bijection exists between vertex sets of the graphs such that any two vertices of the first graph are adjacent in the first graph if and only if those same vertices are also adjacent in the second graph. An incremental ISO query, denoted as IncISO, is also discussed in the sections below. The IncISO algorithm is discussed in detail below, but generally operates as follows. The IncISO algorithm updates the results of the query 101 by determining a set of all edge deletions and edge insertions causing a change to the graph ΔG 105. For each edge deletion, matches including any corresponding deleted edge are removed. This is accomplished by inspecting neighbor graph nodes of any graph node adjacent to the deleted edge within a diameter of the query 101. For each edge insertion, a union of neighbor graph nodes is extracted where neighbor graph nodes are neighbors to any graph nodes adjacent to the inserted edge and within a diameter of the query. The change to the query is then determined based on edge changes. IncISO is localizable because IncISO reviews the changes to the graph ΔG 105 and does not consider the portions of the graph 103 that do not change. Hence, IncISO can be described in terms of a function of ΔG 105 and not as a function of the graph 103 size.

An RPQ query is a query that selects pairs of nodes in a graph database, such as graph 103, when such nodes are connected via a path whose sequence of edge labels belongs to some regular language. A regular language is a formal language that can be expressed by using a regular expression. A regular expression is a text string for describing a search pattern. An incremental RPQ query, denoted as IncRPQ, is also discussed in the sections below. The IncRPQ algorithm is discussed in detail below, but generally operates as follows. An RPQ query is translated into a nondeterministic finite automaton (NFA). A NFA is a finite state machine configured to iterate through a graph, discover edges and nodes, and mark the nodes with data indicating results of the query. This results in an intersection graph that includes graph nodes labels and path information between the graph nodes. IncRPQ receives such data as input. The IncRPQ also receives edge updates (additions or deletions) to the graph. IncRPQ then checks the nodes adjacent to the edge updates and determines whether the updates affect the data at those nodes. When the data is affected, such nodes are placed in a queue. Successors and predecessors of such nodes are also checked until unaffected nodes are reached. The affected nodes are also placed in the queue. The IncRPQ algorithm then employs the NFA to update the data for affected nodes stored in the queue. Accordingly, IncRPQ determines updated query output results 107 based on graph updates 105 without searching the entire graph 103.

An SCC query is a query that searches a graph 103 to find a subgraph where a path exists between all nodes of the subgraph. An incremental SCC query, denoted as IncSCC, is also discussed in the sections below. The IncSCC algorithm is discussed in detail below, but generally operates as follows. The IncSCC algorithm receives/determines a contracted graph containing a node for each SCC in the results of the query. The IncSCC algorithm also receives a graph update 105 containing edge insertions and/or deletions. The IncSCC algorithm checks each node in the contracted graph that contains an edge to be inserted or deleted. For example, such nodes can be placed in a queue. When the change to the graph includes an insertion, nodes corresponding to SCCs including a portion of the insertion are updated resulting in an updated contracted graph. When the change to the graph includes a deletion, nodes corresponding to SCCs including a portion of the deletion are updated, which also results in an updated contracted graph. The IncSCC algorithm can then employ the updated contracted graph to update the results of the query.

Figure 2:
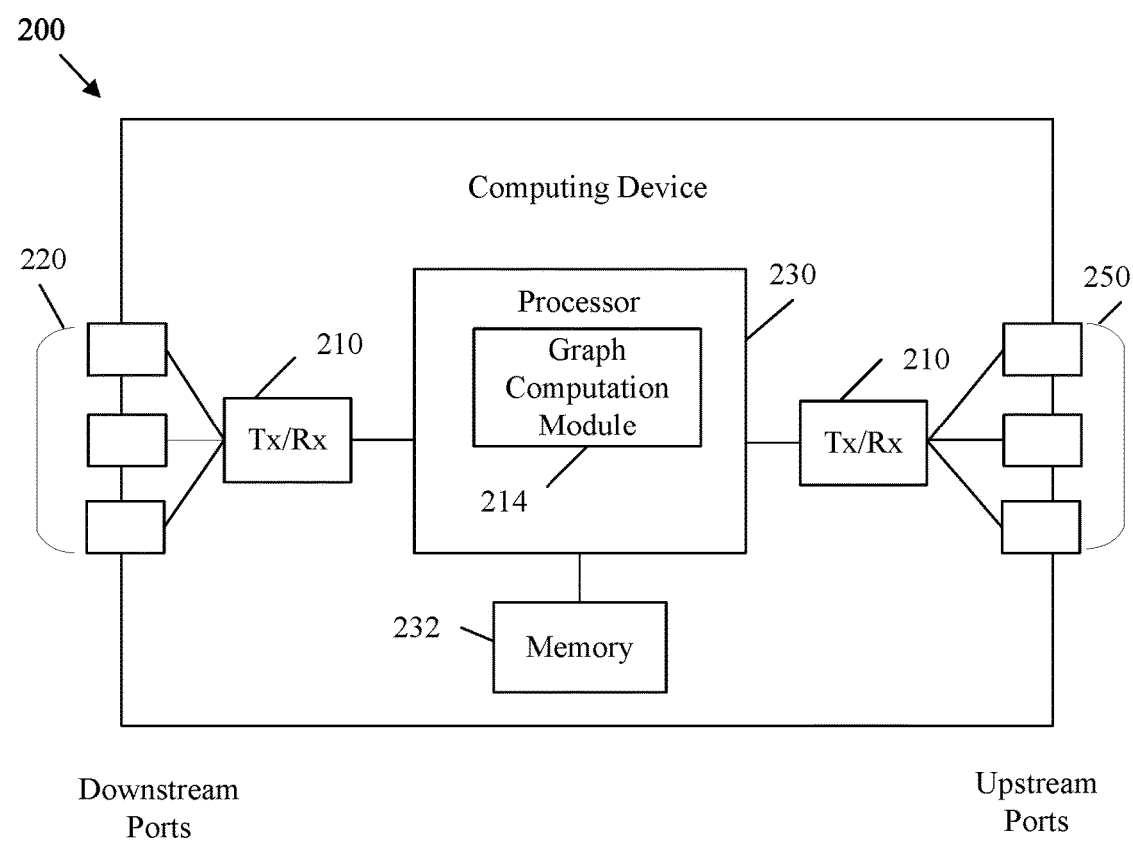
FIG. 2 is a schematic diagram of an example computing device for performing incremental search queries.

FIG. 2 is a schematic diagram of an example computing device 200 for performing incremental search queries, such as a network device, a server, a cloud computing node, or other computing device configured to execute a query, such as query 101 over a dataset of a graph, such as graph 103, over a graph update, such as graph update 105, and/or over updated output such as output 107. For example, computing device 200 may be employed to implement an incremental query, such as IncKWS, IncISO, IncRPQ, and IncSCC as well as corresponding edge insertion/deletion algorithms, as discussed below. Further, computing device 200 may be employed to apply such queries to graph updates instead of operating over the entire graph in order to obtain updated results without the overhead associated with operating a query over a big dataset. Computing device 200 may also implement method 900 and/or any other system, device, method, mechanism, or other item(s) disclosed herein. One skilled in the art will recognize that the term computing device encompasses a broad range of devices of which computing device 200 is merely an example. Computing device 200 is included for purposes of clarity of discussion, but is in no way meant to limit the application of the present disclosure to a particular computing device embodiment or class of computing device embodiments. For instance, the features/methods in the disclosure may be implemented using hardware, firmware, and/or software installed to run on hardware. The computing device 200 may be any device that generates and/or executes search queries over a dataset stored in memory. As shown in FIG. 2, the computing device 200 includes at least a memory 232 and a processor 230.

The memory 232 may include read only memory (ROM), random access memory (RAM), cache memory, registers, solid state memory, flash memory, and/or any other memory device or devices that functions as a data store. The memory 232 may include stored programs, such as computer program products, that when executed, cause the computing device 200 to perform the mechanisms disclosed herein as well as other computing tasks. For example, the memory 232 acts as non-transitory computer readable medium, and the stored programs may comprise a computer program product for use by computing device 200. Such a computer program product includes computer executable instructions stored on the non-transitory computer readable medium such that when executed by a processor, cause the computing device to perform any related steps.

The processor 230 is coupled to the memory 232 and may comprise one or more single core and/or multi-core processors. The processor 230 may be implemented as a general processor, one or more application specific integrated circuits (ASICs), field programmable gate arrays (FPGAs), microcontrollers, digital signal processors (DSPs), etc. The computing device 200 may comprise a graph computation module 214, which may implement method 900 and/or any other system, device, method, mechanism, or other item(s) disclosed herein. For example, the graph computation module 214 may implement IncKWS, IncISO, IncRPQ, and IncSCC as well as corresponding edge insertion/deletion algorithms disclosed herein. Accordingly, graph computation module 214 may receive graphs (or subgraphs thereof), query results, graph updates, etc. as inputs, operate the corresponding incremental query over the graph updates, and output updated graph results without operating the query over the entire graph. In alternative embodiments, graph computation module 214 may be implemented in processor 230, as instructions stored in memory device 232 (e.g., as a computer program product), which may be executed by processor 230, and/or implemented in part in the processor 230 and in part in the memory 232.

The computing device 200 also includes transceivers (Tx/Rx) 210, which may be transmitters, receivers, or combinations thereof. A Tx/Rx 210 may be coupled to downstream ports 220 and/or upstream ports 250. The downstream ports 220 and/or upstream ports 250 are network ports for transmitting and/or receiving data from other network devices over a wired, wireless, electrical, optical, and/or electro-optical networks. Such ports 220 and/or 250 may include network cards, antennas, and/or other hardware that is appropriate for the communication medium. The Tx/Rx 210 send and receive data over the ports 220 and/or 250. The processor 230 is coupled to the Tx/Rx 210 and corresponding ports 220 and/or 250. Hence, the processor 230 and/or the graph computation module 214 are configured to direct the Tx/Rx 210 and corresponding ports 220 and/or 250 to transmit/receive data signals over the network, as well as forward data toward users, depending on the example.

The following is a more formal and more thorough discussion of the topics discussed hereinabove. The following discussion presents the abovementioned mechanisms in terms of formal mathematical proofs. However, the following information can be used in combination with and in furtherance of the examples and embodiments discussed hereinabove.

For a class Q of graph queries, the incremental problem aims to find an algorithm $T\Delta$ that, given a query $Q \in Q$, a graph G, query answers Q(G) and updates $\Delta G$ to G as input, the algorithm computes changes $\Delta O$ to Q(G) such that $Q(G \oplus \Delta G) = Q(G) \oplus \Delta O$ as shown in FIG. 1 above. Here $S \oplus \Delta S$ denotes applying updates $\Delta S$ to S, when S is either a graph G or a query result Q(G). Specifically, $T\Delta$ answers Q in response to $\Delta G$ by computing changes to the cached output of Q(G) instead of recomputing Q(G) over the entire graph G. $T\Delta$ is referred to herein as an incremental algorithm for Q in contrast to batch algorithms T that given Q, G, and $\Delta G$, recompute $Q(G \oplus \Delta G)$ starting from scratch.

The usefulness of incremental computations is evident. Real life graphs G are often big. For example, a real world social media graph has billions of nodes and trillions of edges. Queries to such graphs are expensive in terms of system resources. For example, subgraph isomorphism computations are considered Non-polynomial (NP)-complete, where NP complete problems include some computations that cannot be completed in polynomial time. Moreover, real-life graphs constantly change. Recomputing $Q(G \oplus \Delta G)$ starting from scratch in response to frequent $\Delta G$ may not be feasible, even when abundant computational resources are available. These issues highlight the usefulness of incremental algorithms $T\Delta$. To implement an incremental algorithm $T\Delta$, a batch algorithm T is employed to compute Q(G) (the results of the query over the dataset graph) once, and the results are stored in memory. Then the incremental algorithm $T\Delta$ is employed to compute changes $\Delta O$ to Q(G) (changes to the stored results) in response to $\Delta G$ (changes to the graph). The changes to the results can then be aggregated with the stored results to determine an updated result. The rationale behind this approach is that in most datasets, changes are typically small relative to the size of the dataset. For example, less than five percent of the entire Internet typically changes in a week. When $\Delta G$ is small, $\Delta O$ is often also small. Hence, $\Delta O$ is much less costly to compute than $Q(G \oplus \Delta G)$ when the previous computation of Q(G) is employed. In addition, incremental computations can be employed in conjunction with parallel query processing. Such parallel query processing partitions a big dataset graph G, partially evaluates queries on the partitioned fragments at different processors, treats messages among the processors as updates, and conducts iterative computations incrementally to reduce the cost.

When $\Delta G$ is small relative to G, $\Delta O$ can be computed with $T\Delta$ more efficiently than $Q(G \oplus \Delta G)$ can be computed. $T\Delta$ can be characterized according to a notion of boundedness in relation to graphs. Boundedness measures the cost of $T\Delta$ in $|CHANGED| = |\Delta G| + |\Delta O|$, where $|CHANGED|$ is the size of the changes in the input and output. $T\Delta$ is bounded when $T\Delta$'s cost can be expressed as a polynomial function of $|CHANGED|$ and $|Q|$. The incremental problem for Q is bounded when there exists a bounded $T\Delta$ for Q, where the Q is otherwise unbounded. A bounded $T\Delta$ supports reduction of the incremental computations onto big graphs into computations on small graphs. Resource cost is determined by $|CHANGED|$ and query size $|Q|$, rather than by the size $|G|$ of the entire G. As noted above, $|Q|$ is typically small. Further, $|CHANGED|$ represents the updating cost of the incremental problem. Such resource cost is often much smaller than $|G|$. Hence, a bounded $T\Delta$ warrants efficient incremental determination no matter how big G is.

No matter how desirable, the incremental approach for Q is unbounded when Q includes RPQ, SCC, and KWS. The negative results hold when $\Delta G$ includes a single edge deletion or insertion. Further, graph pattern matching via ISO is also unbounded. For these queries, a completely bounded incremental algorithm is unavailable. However, this issue can be overcome when $T\Delta$ can be characterized as localizable and/or relatively bounded.

The incremental problem for Q is localizable when there exists an incremental algorithm $T\Delta$ such that for $Q \in Q$, G and $\Delta G$, associated cost is determined by $|Q|$ and the $d_Q$ neighbor nodes of nodes in $\Delta G$, where $d_Q$ is determined based on $|Q|$. In practice, Q and $d_Q$ are typically small. Hence, the computations on big G can be reduced to a small set of $d_Q$ set of neighbor node to nodes impacted by $\Delta G$. As discussed more fully below, the incremental problems for KWS and ISO are localizable and hence an incremental graph computation can be determined even though KWS and ISO are unbounded.

The incremental algorithm can also be employed when changes to the graph are relatively bounded. For example, a batch algorithm T for Q may be completed incrementally. For a query Q∈Q and a graph G, the part of the data in G inspected by T when computing Q(G) can be denoted as $G_{(T,Q)}$. Given updates ΔG to G, the difference between $(G \oplus \Delta G)_{(T,Q)}$ and $G_{(T,Q)}$ can be denoted as AFF. AFF indicates the cost for incrementalizing T. TΔ incurs this minimum cost, which is not measured in |G|. An incremental algorithm TΔ for Q is bounded relative to T if the algorithm's cost in resources can be determined as a polynomial function in terms of |ΔG|, |Q|, and |AFF|. RPQ and SCC are relatively bounded. Specifically, RPQ and SCC batch algorithms T can be incrementalized to reduce unnecessary recomputation of T.

The disclosure studies the effectiveness of incremental graph computations, and characterizes localizable incremental computations and relative boundedness. Specifically, the incremental computations discussed herein are localizable (KWS and ISO) or relatively bounded (RPQ and SCC). While these incremental computations are unbounded, they can still be effectively conducted with performance guarantees. Further, this disclosure provides localized incremental algorithms for KWS and ISO as well as bounded incremental algorithms for RPQ and SCC relative to their batch algorithms. Optimization techniques for processing batch updates are also included. The disclosed algorithms have been subject to experimental study. The disclosed localizable and relatively bounded incremental algorithms for KWS, RPQ, SCC, and ISO are effective. Example incremental algorithms outperform their batch counterparts even when |ΔG| is up to thirty percent, thirty five percent, twenty five percent, and twenty five percent of |G|, respectively. Further, implemented examples of the disclosed algorithms are on average 4.9, 6.2, 2.9 and 3.7 times faster than batch counterparts when |ΔG| accounts for ten percent of |G|. The disclosed algorithms also scale well with |G|. For instance, example incremental algorithms take twenty eight (KWS), one hundred (RPQ), nineteen (SCC), and two hundred twenty five (ISO) seconds, respectively, on a graph G with fifty million nodes, one hundred million edges, and under five percent updates. Similar batch algorithms take one hundred ninety, one thousand seventy two, one hundred forty four, and two thousand three hundred seventy six seconds, respectively. The disclosed optimization strategies improve the performance by 1.6 times on average.

This disclosure considers directed graphs G represented as (V, E, l), where V is a finite set of nodes; E⊆V×V is a set of edges in which (v, v') denotes an edge from node v to node v', and each node v in V includes l(v), which is a label and content as found in social networks and property graphs. When (v, w) is an edge in E, node w is referred to as a successor of node v, and node v is a predecessor of node w. Graph Gs=(Vs, Es, ls) is a subgraph of G when Vs⊆V, Es⊆E, and for each node v∈Vs, ls(v)=l(v). Subgraph Gs is induced by Vs when Es includes all the edges in G such that their endpoints are both in Vs.

An RPQ is defined formally as follows. Example directed graphs G=(V, E, l) employ a finite alphabet Σ of labels defined on the nodes in V. A path ρ from node v0 to node vn in G is a list of nodes (v0, . . . , vn), where for i∈[0, n−1], (vi, vi+1) is an edge in G. The length of path ρ is n. A regular path query Q is a regular expression as follows: Q::=ε|α|Q·Q|Q+Q|Q*. Here ε denotes an empty path, α is a label from Σ, · and + are concatenation and union operators, respectively, and Q* indicates zero or more occurrences of Q. L(Q) denotes the regular language defined by Q, which includes the set of all strings that can be parsed by Q. For a path ρ=(v0, . . . , vn) in G, l(ρ) denotes the labels l(v0) . . . l(vn) of the nodes on ρ. A match of Q in G is a pair (v, w) of nodes such that there exists a path ρ from v to w having l(ρ)∈L(Q). An RPQ is a query Q applied to a directed graph G. The RPQ outputs the set Q(G) of all matches of Q in G. A nondeterministic finite automaton (NFA) can determine Q(G) in O(|V||E||Q|2 log 2|Q|) time, where |Q| is the number of occurrences of labels from Σ in Q. In this disclosure, O refers to big O notation where O describes the worst case scenario execution time/space employed to execute an algorithm.

An SCC is defined formally as follows. A subgraph Gs of a directed graph G is a strongly connected component of G when for any pair (v, v') of nodes in Gs, there is a path from v to v' and vice versa, and when adding any node or edge to subgraph Gs renders subgraph Gs no longer strongly connected. SCC(G) denotes the set of all strongly connected components of G. Hence, in an SCC context, a directed graph G can be received as input, and an SCC(G) is output. SCC can be completed in O(|V|+|E|) time.

An KWS is defined formally as follows. A keyword query Q is of the form (k1, . . . , km), where each ki is a keyword. Given a directed graph G and a bound b, a match to Q in G at node r is a tree T (r, p1, . . . , pm) such that T is a subgraph of G, r is the root of subgraph T. Further, for each i∈[1, m], pi is a node in T such that l(pi)=ki, indicating that the label of node pi matches keyword ki. In addition, $\Sigma_{i \in [1, m]}$ dist(r, pi)≤b, and the sum $\Sigma_{i \in [1, m]}$ dist(r, pi) is the smallest among all such trees. Here for a pair of nodes (r, s), dist(r, s) denotes the shortest distance from r to s, e.g., the length of a shortest path from r to s. For a KWS a directed graph G, a keyword query Q=(k1, . . . , km), and a positive integer bound b are received as input. The KWS outputs the set Q(G) of all matches to Q at node r in G within b hops, for r ranging over all nodes in G. A KWS can be computed in O(m(|V| log |V|+|E|)) time.

An ISO is defined formally as follows. A pattern query Q is a graph (VQ, EQ, lQ), in which VQ and EQ are the set of pattern nodes and directed edges, respectively, and each node u in VQ has a label lQ(u). A match of Q in G is a subgraph Gs of G that is isomorphic to Q. An isomorphic relationship indicates there exists a bijective function h from VQ to the set of nodes of Gs such that for each node u∈VQ, lQ(u)=l(h(u)), and (u, u') is an edge in Q iff (h(u), h(u')) is an edge in Gs. The answer Q(G) to Q in G is the set of all matches of Q in G. An ISO a receives a directed graph G and a pattern Q as an input and outputs the set Q(G) of all matches of Q in G. Determination of whether Q(G) is empty for an ISO is NP-complete.

Table 1 below contains various notations as used herein for ease of reference.

TABLE 1

| Symbols | Notations |
|---|---|
| Q(G) | the answers to query Q in graph G |
| ΔG | updates to graph G (edge insertions, deletions) |
| G ⊕ ΔG | the graph obtained by updating G with ΔG |
| ΔO | updates to previous results Q(G) in response to ΔG |
| T | a batch algorithm for a query class Q |
| TΔ | an incremental algorithm for Q |
| AFF | changes to the area inspected by a batch algorithm T |
| dist(s, t) | the shortest distance from node s to t |
| $G_d(v)$ | the d-neighbor of node v in G |

The following formally describes incremental computation. Incremental graph computation specifically considers graph updates that include edge/node insertion (insert e), edge/node deletion (delete e), and batch updates ΔG to a graph G as a sequence of unit updates. In this context, for a class Q of graph queries, the incremental problem is stated as follows. A graph G, a query Q∈Q, an old output Q(G), and updates ΔG to the graph G are received as input. The incremental computation algorithm then outputs updates ΔO to the output such that Q(G⊕ΔG)=Q(G)⊕ΔO. The incremental computation algorithm is specifically employed herein for RPQ, SCC, KWS and ISO, but may also be employed for other query types.

The following disclosure discusses the nature of localization in the context of incremental algorithms and discusses the application of localizable incremental search computations for KWS and ISO.

From a terminology standpoint, in a graph G, a node v' is within d hops of v when dist(v, v')≤d by taking G as an undirected graph. Further, Vd(v) denotes the set of all nodes in G that are within d hops of v. In addition, the d-neighbor Gd(v) of v is the subgraph of G induced by Vd(v), in which the set of edges is denoted by Ed(v).

An incremental algorithm TΔ for a graph query class Q is localizable when the incremental algorithm's TΔ cost is determined by |Q| and the sizes of the $d_Q$-neighbors of the nodes on the edges of ΔG, where dQ is determined by the query size |Q|. The incremental problem for Q is localizable when there exists a localizable incremental algorithm for Q. When TΔ is localizable, ΔO can be computed by inspecting only $G_{dQ}(v)$, where $G_{dQ}(v)$ indicates the nodes within dQ hops of nodes v in ΔG. In practice, $G_{dQ}(v)$ is often small. Q is typically small, as ninety eight percent of real-life pattern queries have a radius of one, and 1.8% have radius of two, and hence $d_Q$ is also small. Further, real-life graphs are often sparse. For instance, the average node degree is 14.3 in social graphs. Hence, TΔ can reduce the computations on a big G to a small $G_{dQ}(v)$.

As shown below, the incremental problem is localizable for KWS and ISO under batch updates. Specifically, while the incremental problems for KWS and ISO are unbounded, incremental computations can still be performed on KWS and ISO by reducing the effective size of the graphs to be searched when updates occur.

A localizable algorithm for KWS is available when an edge is inserted to the graph. Localizable algorithms can also be employed for KWS to process edge deletions and batch updates. As previously mentioned, a KWS query includes a list Q of keywords and an integer bound b. For each node v in graph G, a keyword-distance list kdist(v) is maintained. Kdist(v) entries are of the form (keyword, dist, next), where dist is the shortest distance from a node v to a node labeled keyword in the keyword list Q, and next indicates the node on the shortest path next to v. A single shortest path is selected with a predefined order in case of a tie. Hence, each root uniquely determines a match if a match exists. Such keyword-distance lists are obtained after the execution of a batch algorithm. For example, batch approaches for KWS traverse G to find shortest paths from nodes to other nodes matching keywords in Q. While KWS algorithms vary in search and indexing strategies, KWS generally maintain a kdist(•).

The following is a localizable incremental algorithm for KWS in the case of edge insertions, referred to herein as IncKWS+. IncKWS+ is employed to apply a KWS based query when a node/edge is inserted into a graph. IncKWS+ receives input including a graph G with kdist(•), a keyword query Q, a bound b, matches Q(G), and an edge (v,w) to be inserted. IncKWS+ outputs the updated matches Q(G⊕ΔG) and kdist lists. IncKWS+ is as follows:

1. for each ki in Q with kdist(w)[ki].dist < min(kdist(v)[ki].dist − 1, b) do
2.     kdist(v)[ki].dist := kdist(w)[ki].dist + 1;
3.     kdist(v)[ki].next := w; queue qi := nil; qi.enqueue(v);
4.     while qi is not empty do
5.         node u := qi.dequeue( );
6.         for each predecessor u' of u such that kdist(u)[ki].dist < min(kdist(u')[ki].dist − 1, b) do
7.             kdist(u')[ki].dist := kdist(u)[ki].dist + 1;
8.             kdist(u')[ki].next := u; qi.enqueue(u');
9.     for each $u_1$" and $u_2$" involved in a changed kdist(u)[ki].next do
10.        replace (u, $u_1$") with (u, $u_2$") in all the matches of Q(G) or
               add matches to Q(G ⊕ΔG) by including (u, $u_2$");
11. return Q(G ⊕ΔG) (including revised Q(G)) and kdist(•);

IncKWS+ is discussed in more detail below. Specifically, inserting an edge to graph G may shorten the shortest distances from nodes to those matching keywords in Q, which is reflected as changes to dist and next in the keyword-distance lists on G. Based on this, IncKWS+ may be employed to process unit edge insertions. In this case, a ΔG is received that includes an edge insertion as insert(v,w). IncKWS+ inspects whether ΔG causes any change to shortest paths of existing matches. If so, IncKWS+ propagates the changes, revises kdist(v) entries for affected nodes v and updates the matches accordingly. This process proceeds until no more revision remains. The search is confined in the b-neighbors of nodes in ΔG. Hence IncKWS+ is localizable, where b is the bound in the KWS query. More specifically, IncKWS+ first checks whether (v,w) is on a shorter path within the bound b from v to nodes labeled ki in Q (line 1). If so, kdist(v) is adjusted by updating dist and next (lines 2-3). IncKWS+ then propagates the change to the ancestors of v when their kdist entries are no longer valid (lines 4-8). A first-in-first-out (FIFO) queue qi is used to control the propagation, following a breadth-first-search (BFS). Each time a node u is dequeued from qi, the predecessors of u are inspected to check whether u triggers an updated shortest path from them within bound b, followed by updating their kdist entries when appropriate (lines 6-8). These predecessors may be inserted into queue qi for further checking (line 8). After revising the data structures, IncKWS+ computes Q(G⊕ΔG) based on the changes to next in kdist(•) (lines 9-10), either by replacing some edges in existing matches, or by including new matches not in Q(G). Such affected edges are inside the 2b-neighbors of ΔG.

Figure 3:
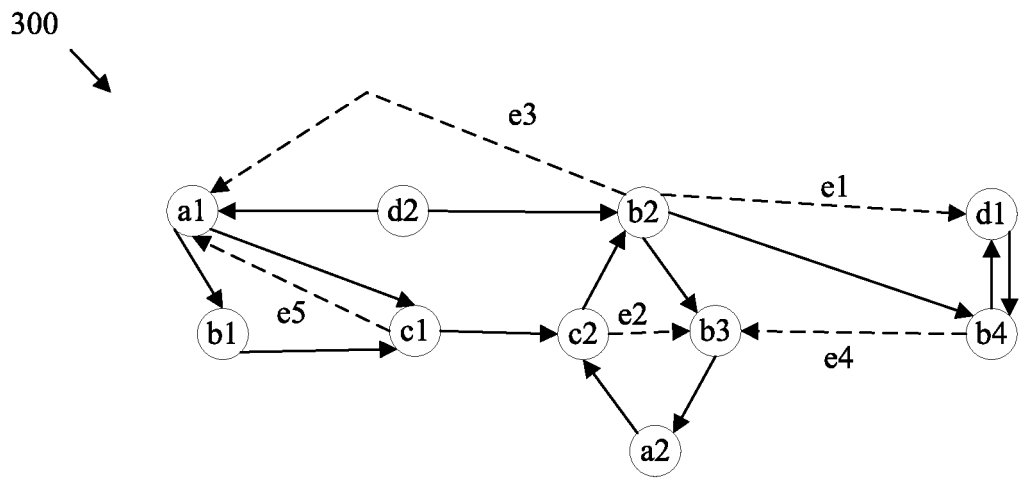
FIG. 3 is a schematic diagram of an example dataset graph.

FIG. 3 is a schematic diagram of an example dataset graph 300. The graph 300 contains nodes a1-a2, b1-b4, c1-c2, and d1-d2 connected by edges which are depicted as solid lines. The graph 300 also contains insertions depicted as dotted lines e1-e5. Accordingly, the nodes and solid line edges form G and the dotted edges represent ΔG.

Figure 4:
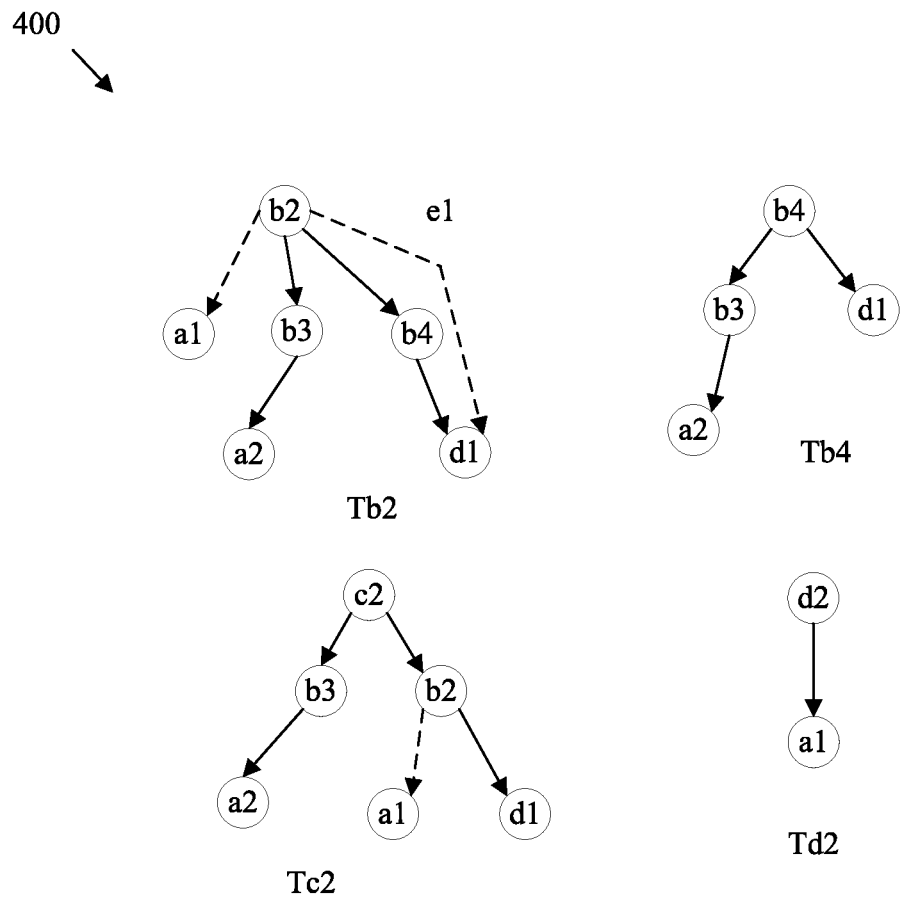
FIG. 4 is a schematic diagram of example results of a key word search (KWS) on a dataset graph.

FIG. 4 is a schematic diagram of example results 400 of a KWS on a dataset graph, such as graph 300. Specifically, results 400 occur when a KWS based query Q=(a, d) and a bound of two are applied to graph 300. The results 400 include four subgraphs denoted as trees Tb2, Tb4, Tc2, and Td2. The results 400 are shown in conjunction with application of IncKWS+, edge deletion algorithm IncKWS−, and batch algorithm IncKWS as discussed below.

Specifically, prior to insertion of the edges e1-e5, trees Tb2 and Td2 are determined as Q(G) for the KWS query. Then an update inserts edge e1 to graph 300. IncKWS+ finds that the shortest distance from b2 to nodes matching d is reduced to one from two. Accordingly, IncKWS+ updates the entries in kdist(b2)[d] and propagates the change to b2's predecessors. The propagation stops at c2 since the shortest distance from node c2 to node d nodes reaches the bound of two. The values of <dist, next> in kdist lists on G are updated as shown in Table 2.

TABLE 2

| IncKWS+ | Before insertion | After insertion |
| --- | --- | --- |
| kdist(b2)[d] | <2, b4> | <1, d1> |
| kdist(c2)[d] | <⊥, nil> | <2, b2> |

Specifically, IncKWS+ revises Tb2 by replacing the path starting with edge (b2, b4) with a path of distance one including inserted edge (b2, d1), which results in a tree that can be denoted as T'b2 in Q(G1). Further, IncKWS+ obtains a new match, which is depicted as Tc2. Tc2 is then added to Q(G1). Tree Tb4 is the results of an IncKWS batch algorithm which is discussed below.

As shown above, IncKWS+ updates kdist(•) correctly. Specifically, IncKWS+ revises entries in which dist values are decreased, and checks all affected entries by propagating the changes up to a bound. From this the correctness of IncKWS+ follows. From a complexity standpoint, IncKWS+ operates in $O(m(|Vb(w)|+|Eb(w)|)+|Vb(w)||E2b(w)|)$ time. Updating kdist(•) takes $O(m(|Vb(w)|+|Eb(w)|))$ time in total (lines 1-8), where m is the number of keywords in Q. Further, each node with updated kdist is verified at most m times to check all the keywords in Q. Also, only the data in Gb(w) is inspected since change propagation stops as soon as the shortest distance exceeds b. Specifically, kdist(•)'s are partially updated for matches within bound b. Updating Q(G) (lines 9-10) takes $O(|Vb(w)||E2b(w)|)$ time since the roots of the affected matches are within b hops of w, and their edges to be adjusted are at most 2b hops away from w. Therefore, algorithm IncKWS+ is localizable.

An algorithm, denoted as IncKWS− can be employed for incremental computation of a KWS query when edges are deleted as part of a graph update ΔG. In contrast to edge insertions, some shortest distances in kdist lists may be increased when an edge is deleted according to delete(v,w), where delete(v,w) removes an edge between node v and node w. IncKWS− is configured to identify the entries in kdist(•) that are affected by ΔG, and compute changes to dist and next. Similar to IncKWS+, updating kdist(•) is confined within the b-neighbors of ΔG by inspecting only those distances no longer than bound b. The identification and computation are separated into two phases in IncKWS−. IncKWS− may receive inputs that include G with kdist(•), Q, b, Q(G), and delete(v, w). IncKWS− then outputs the updated matches Q(G⊕ΔG) and kdist lists. IncKWS− is as follows:

1. for each ki in Q with w = kdist(v)[ki].next and kdist(w)[ki] < b do
2.     queue qi := nil; stack ai := nil; ai.push(v); mark v affected;
3.     while ai is not empty do
4.         node u := ai.pop( );
5.         for each predecessor u' of u that u = kdist(u')[ki].next and kdist(u')[ki] ≤ b do
6.             ai.push(u'); mark u' affected;
7.     for each affected node u do
8.         compute dist and next for kdist(u)[ki] based on those u's successors that are not affected;
9.         qi.insert(u, kdist(u)[ki].dist);
10.     while qi is not empty do
11.         (u, d) := qi.pull_min( );
12.         for each predecessor u' of u with d < min(kdist(u')[ki].dist − 1, b) do
13.             kdist(u')[ki].dist := d + 1; kdist(u')[ki].next := u;
14.             qi.decrease(u' ,kdist(u' )[ki].dist);
15. for each u"1 and u"2 involved in a changed kdist(u)[ki].next do
16.     replace (u, u"1 ) with (u, u"2 ) in all the matches of Q(G) or remove matches from Q(G) by excluding (u, u"1);
17. return Q(G ⊕ΔG) (updated Q(G) above) and kdist(•);

IncKWS−, as shown above, operates as follows. After consulting whether (v,w) is on a shortest path from v to some node labeled keyword ki within bound b, IncKWS− propagates the change to v's predecessors, when appropriate, with the help of a stack ai. Each predecessor that may have an updated shortest path to nodes matching ki is marked as affected with respect to ki (lines 1-6). The propagation is similar to that of IncKWS+, includes inspecting next values, and is conducted in the b-neighbors of v. Then the potential kdist entries for those affected nodes are computed based on their successors that are not affected with respect to ki (line 8). Affected nodes with their potential dist values (as keys) are inserted into priority queue qi (line 9) to compute exact dist values later. The exact values of dist and next may depend on the affected successors, whose values are also determined. The exact values of dist and next are computed in the second phase (lines 10-14). For node u with minimum dist that is removed from qi, IncKWS− checks whether the deletion leads to a new shortest path within bound b originated from predecessor u' of u (lines 11-12). If so, values in kdist(u')[ki] are updated, and the key of u' in qi is decreased (lines 13-14). The process continues until qi becomes empty. Matches in Q(G) are updated using the latest kdist lists (lines 15-16).

Referring back to FIGS. 3-4, in an example, edge e2 is now removed from G as a ΔG. This makes the shortest path from c2 to a2 in Tc2 split. When IncKWS− is applied, IncKWS− marks node c2 as affected with keyword a. Since the shortest distance from successor b2 of c2 to nodes matching a equals the bound of two, IncKWS− concludes that node c2 cannot be the root of a match, and removes Tc2 of from Q(G).

The correctness of IncKWS− is verified in a manner similar to IncKWS+, except that the values of kdist(v) may depend on multiple affected successors of v. IncKWS− operates in $O(m(|Vb(w)| \log |Vb(w)|+|Eb(w)|)+|Vb(w)||E2b(w)|)$ time, including $O(|Vb(w)||E2b(w)|)$ for updating matches in addition to the cost for computing changes to kdist(•)'s. IncKWS− first phase (lines 1-9) takes $O(m(|Vb(w)|+|Eb(w)|))$ time since only the affected shortest paths of length bounded by b are identified. The second phase (lines 10-14) takes $O(m(|Vb(w)| \log |Vb(w)|+|Eb(w)|))$ time, which is the same as computing a b-bounded shortest path from affected nodes to m sinks, e.g., nodes labeled a keyword from Q.

An algorithm, denoted as IncKWS can be employed for incremental computation of a KWS query when a graph update ΔG includes a batch update. A batch update includes a series of automated updates and/or jobs based on multiple stored inputs without direct user interaction. Accordingly, IncKWS+ and/or IncKWS− may be employed when users make changes to the graph, and IncKWS may be employed when a larger number of changes are applied programmatically to the graph. For example, IncKWS processes batch updates ΔG=(ΔG+,ΔG−), where ΔG+ and ΔG− denote graph edge insertions and deletions, respectively. For purposes of simplicity, IncKWS assumes the same edge e is not both deleted ΔG− and inserted in ΔG+, which can be detected and mitigated prior to application of IncKWS. Given batch updates ΔG, IncKWS inspects whether each unit edge deletion and insertion causes any change to existing matches. Specifically, IncKWS determines whether any of the existing shortest paths become invalid and/or new shortest paths should be generated due to the corresponding unit edge changes. When such a change occurs, IncKWS propagates the changes and updates the affected keyword-distance lists. In an example, IncKWS updates the same entry at most once even when the entry is affected by multiple updates in ΔG. This is accomplished by interleaving different change propagation with a global data structure to accommodate the effects of different unit updates. IncKWS operates in three phases, as outlined below.

IncKWS first identifies the affected nodes with respect to each keyword ki in Q due to ΔG− within the b-neighbors of ΔG−. IncKWS may compute their potential dist and next values using the same strategy of IncKWS−. The affected nodes with respect to ki and their potential dist values are inserted into a single priority queue qi to further compute exact values. IncKWS then checks whether each insert(v,w) leads to the creation of a shorter path within bound b when neither v nor w is affected by ΔG− with respect to ki. Insertions with affected nodes are not considered since dist value at w may no longer be correct due to ΔG−, or because such inserted edge has already been inspected to compute a potential dist value for node v. If an insert results in a shorter path within the bound, dist and next values are updated for kdist(v). Unlike IncKWS+ that propagates this change to ancestors of v directly, IncKWS inserts node v and the updated dist value into queue qi to interleave insert(v,w) with other updates in ΔG. IncKWS then computes exact next and dist values of kdist(•), in a manner similar to IncKWS− by making use of queue qi. Potential changes to kdist(•) caused by ΔG, including both deletions and insertions, are collected into the same qi. In this way IncKWS ensures that the exact value (the shortest distance) is decided at most once for each entry affected. Matches in Q(G) are updated accordingly within the 2b-neighbors of the ΔG.

As an example, IncKWS may be applied when a batch update ΔG inserts edges e1, e3, e4 into graph 300 and deletes edges e2 and e5. IncKWS first identifies the affected nodes c1 and c2 with respect to nodes labeled a. IncKWS finds that the potential value of the corresponding dist exceeds the bound 2. IncKWS then processes insertions. Specifically, the insertion of e3 leads to a decreased shortest distance from b2 to nodes labeled a, and the change is propagated to c2 for determining the exact value of kdist(c2)[a]. For example, IncKWS interleaves insert e3 and deletes e2 to decide the exact shortest distance from c2 to nodes labeled a. The other updates are handled similarly. Based on these, IncKWS replaces the two branches of Tb2 in results 400 with (b2, a1) and (b2, d1), respectively. Further, IncKWS adds match Tb4 to results 400. In addition, a new match T'c2 may also be generated, where path (c2, b3, a2) in Tc2 is replaced by (c2, b2, a1).

IncKWS operates correctly for the reasons that follow. For example, each node that is affected with respect to keyword ki by any unit update in ΔG is inspected by IncKWS. Further, the dist values for these nodes are monotonically increasing and correctly computed, similar to IncKWS−. IncKWS operates in $O(m(|Vb(\Delta G)| \log |Vb(\Delta G)|+|Eb(\Delta G)|)+|Vb(\Delta G)||E2b(\Delta G)|)$ time, where Vb(ΔG) (respective Eb(ΔG)) denote the nodes (respective edges) of the union of b-neighbors of nodes in ΔG. The final kdist value of each affected node with respect to any keyword ki is determined once by using the global priority queue qi. The complexity analysis is similar to that of IncKWS−, except that here the 2b-neighbors of all the nodes involved in ΔG are potentially accessed. Since the costs of IncKWS+, IncKWS− and IncKWS are determined by m and the size of 2b-neighbors of nodes involved in ΔG for a given bound b, the IncKWS algorithms are each localizable.

Although the incremental algorithms for KWS are disclosed herein as employing a constant bound b, they can be readily extended to employ a variable bound b. More specifically, when change propagation stops at node v due to bound b, node v can be designated as a breakpoint with respect to bound b, and the set of all such breakpoints can be stored as a snapshot of graph G with respect to bound b. When a larger bound b is employed, the snapshot is first restored and each breakpoint is regarded as a unit update to G. Specifically, the breakpoints are each considered as an input to the incremental algorithm with bound b in addition to ΔG. The change propagation then continues from this point. In this way, KWS queries with different b values can be answered using the same data structure, e.g., a keyword-distance list that is consistently updated. Further, the snapshot of G is stored with respect to the maximum b that is encountered.

A localizable algorithm for ISO can also be implemented by employing the principles disclosed herein. Given a pattern query Q and a graph G, an ISO query is employed to determine the set Q(G) of all matches of Q in G, in this case all subgraphs of G that are isomorphic to Q. The deletion of an edge e may cause the removal of matches that include e from Q(G). Conversely, insertion of e=(v,w) may add new matches to Q(G). These matches are within $G_{dQ}(v)$ and $G_{dQ}(w)$, where dQ is the length of the longest shortest path between any two nodes in Q when taken as an undirected graph, e.g., the diameter of Q. Based on this, a localizable incremental algorithm, denoted by IncISO, can be employed for ISO under batch updates. IncISO works as follows. IncISO collects the set ΔG− of all edge deletions in ΔG. For each deletion of an edge e, IncISO removes those matches including edge e from Q(G) by inspecting the dQ-neighbors of the two nodes on edge e, where dQ is the diameter of Q. For the rest of updates in ΔG, e.g., the edge insertions ΔG+, the union of dQ-neighbors of the nodes involved in these edge insertions is extracted as denoted by $G_{dQ}(\Delta G+)$. Further, IncISO invokes a batch algorithm for ISO, such as a so called VF2 algorithm, to compute $Q(G_{dQ}(\Delta G+))$ all together rather than one by one. Those matches that are not in the results Q(G) are then added to the results Q(G). The cost of IncISO can be expressed as a function of |Q| and $|G_{dQ}(\Delta G)|$, instead of the size |G| of the entire graph G. Accordingly, IncISO is localizable, and hence so is ISO. $G_{dQ}(\Delta G)$ also includes the dQ-neighbors of nodes involved in edge deletions.

Localizable incremental graph update algorithms are discussed in detail above. Relative boundedness, as discussed in detail below, is another mechanism to ensure the effectiveness of incremental computations. For example, a batch algorithm T for a class of query Q may be employed to update a graph G. For a query Q∈Q and a graph G, the data inspected by algorithm T when computing Q(G) is denoted as $G_{(T,Q)}$. The data inspected includes data in G and possibly auxiliary structures used by algorithm T. For updates ΔG to graph G, AFF denotes the difference between $(G \oplus \Delta G)(T,Q)$ and G(T,Q), which is the difference in the data inspected by algorithm T when determining Q(G⊕ΔG) and when determining Q(G).

An incremental algorithm TΔ for Q is bounded relative to T when the algorithms cost in resources/time can be expressed as a polynomial function in terms of |ΔG|, |Q| and |AFF| for Q∈Q, graph G and updates ΔG. Changes ΔO to Q(G) are included in AFF as they are a function of ΔG.

When incrementalizing batch algorithms T, relative boundedness characterizes the effectiveness of the incrementalization. For example, incrementalization of a batch algorithm T is effective when such incrementalization mitigates unnecessary recomputation in response to updates ΔG. Accordingly, the present disclosure includes incremental algorithms TΔ that are bounded relatively to a corresponding algorithm T.

For a class of graph queries Q, a localizable incremental algorithm can be found only when Q has the data locality. Specifically, Q has data locality when determining whether v is in the answer Q(G) to a query Q, and only employs inspection of the dQ-neighbor of v. However, many graph queries, such as RPQ and SCC, do not have data locality. Relatively bounded incremental algorithms can be employed for such queries. Moreover, even when a query Q has data locality, incremental algorithms may be both localizable and bounded relative to a practical batch algorithm of Q. Such algorithms are particularly useful for large queries Q (e.g., when diameter dQ of Q is large). As shown below, there are bounded incremental algorithms for RPQ and SCC relative to their batch counterparts. Specifically, this disclosure includes relatively bounded algorithms for RPQ and SCC. These algorithms are effective although none of the query classes is bounded.

The following relates to an incremental algorithm for RPQ based queries. Given a regular path query Q and a graph G, the incremental algorithm should compute the set Q(G) of matches of Q in the G, where matches include pairs (v, w) of nodes in G such that v can reach w by following a path in the regular language defined by Q. The incremental batch algorithm employed for RPQ queries is denoted herein as a RPQ nondeterministic finite automaton (RPQNFA).

The RPQNFA algorithm employs two phases. Given a query Q and graph G, RPQNFA first translates Q into an NFA MQ. RPQNFA then computes Q(G) by traversing the graph G guided by the NFA MQ. The time complexity of RPQNFA is $O(|V||E||Q|^2 \log^2|Q|)$. Specifically, the NFA MQ=(S,Σ, δ, s0, F), where S is a finite set of states, Σ is a corresponding alphabet, δ is a transition function that maps S×Σ to the set of subsets of S, s0∈S is the initial state of MQ, and F⊆S is the set of accepting states. Multiple mechanisms can be employed to construct an NFA, for example based on partial derivatives or other mechanisms for converting a regular expression into a NFA. After the NFA MQ is in place, the second phase starts. Specifically, the RPQNFA algorithm traverses the intersection graph GI=($V_I$, $E_I$, $l_I$) of G and NFA MQ, where $V_I$=V×S, $l_I$ (v, s)=l(v), $E_I$⊆VI×VI and ((v, s), (v', s')) is in $E_I$ if and only if (v, v')∈E and s'∈δ(s, l(v')). Each node v in G is marked with a set v.pmark(•) of markings, where v.pmark(u) is a set of states s in S, indicating that there exists a path ρ from u to v in G such that (u, s0) reaches (v, s) following the corresponding path ρI of ρ in GI. When a node v is visited in state s, only the successor v' of v with δ(s, l(v')) !=∅ are inspected. The markings prevent a node from being visited more than once in the same state. This includes (u, v) in Q(G) if v.pmark (u)∩F !=∅. Specifically, there exist state s∈v.pmark(u) and a path ρI from (u, s0) to (v, s) such that $l_I$(ρI)∈L(Q).

Figure 5:
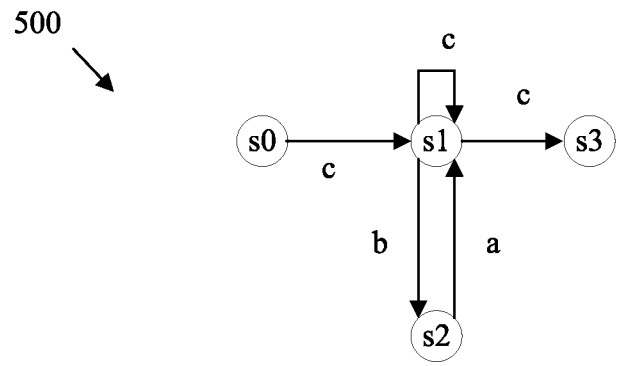
FIG. 5 is a schematic diagram of an example state machine for a nondeterministic finite automata (NFA) based query.

FIG. 5 is a schematic diagram of an example state machine for a NFA 500 query as discussed above. Specifically, the RPQNFA algorithm generates a NFA 500 based on an RPQ query. The NFA 500 includes a plurality of states as shown. In this example, the NFA 500 include state zero (s0), state one (s1), state two (s2), and state three (s3). The NFA 500 has an initial state of s0, a final state of s3, and moves between states as shown. As the NFA 500 is generated to incrementally implement a particular RPQ, the number and configurations of states of the NFA 500 varies depending on the RPQ employed. In this example, the NFA 500 is generated from an RPQ query Q=c·(b·a+c)*·c applied to graph 300.

Figure 6:
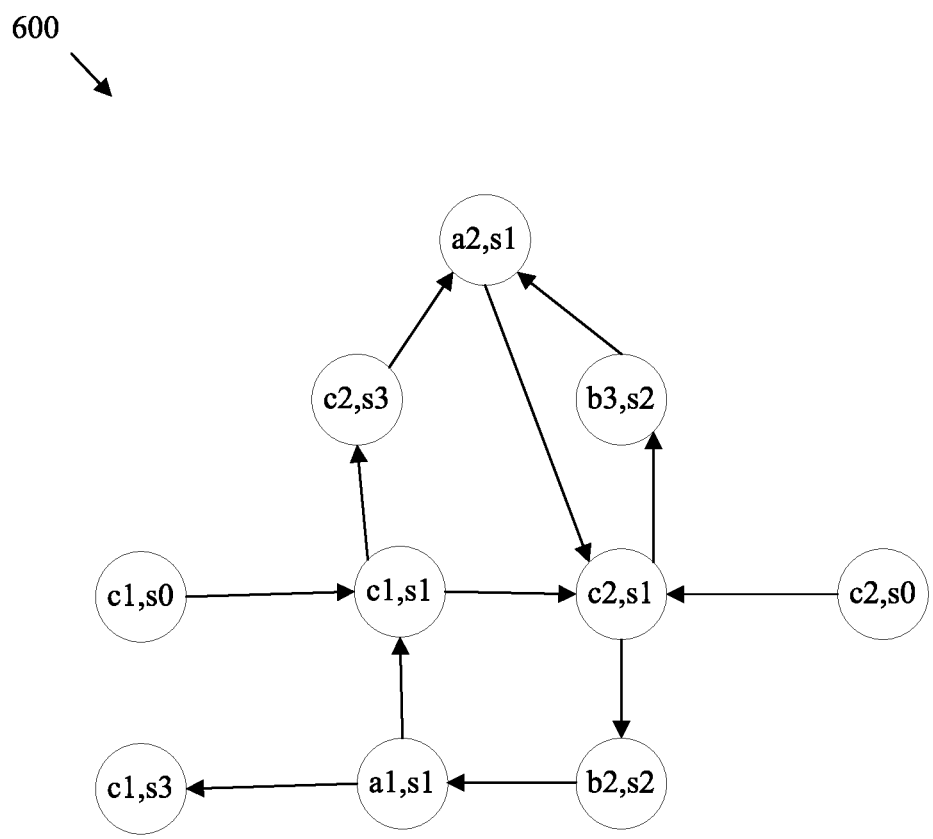
FIG. 6 is a schematic diagram of an example intersection graph of the NFA query and a dataset graph.

FIG. 6 is a schematic diagram of example intersection graph 600 of the NFA 500 query and a dataset graph 300. Specifically, intersection graph 600 depicts the states of the NFA 500 that operate on each node of the graph 300. Hence, the graph 600 includes nodes marked by their node labels and by the label of the NFA 500 state acting on the node. The graph 600 also includes links that preserve the relationships between the nodes in graph 300.

The intersection graph 600 is a fragment intersection graph $G_I$ of G, as graph 600 excludes dotted edge ((b2, s2), (a1, s1))). Further, RPQNFA employs the NFA 500 to traverse $G_I$ to generate intersection graph 600 by marking the nodes in graph 300 G with the states of NFA 500 MQ. In this example, there exist paths from (c1, s0) to (c2, s3) and from (c2, s0) to (c2, s3) in GI. Thus, the accepting state s3 is included in markings c2.pmark(c1) and c2.pmark(c2). Therefore, (c1, c2) and (c2, c2) are returned by RPQNFA.

The marking v.pmarke(u) is of the form (state, dist, cpre, mpre), where dist is the shortest distance from (u, s0) to (v, state) in $G_I$. Further, (v', s') is contained in v.pmarke(u)[s].cpre when there exists an entry in v'.pmarke(u) for state s' such that s∈δ(s', l(v)) and (v', v) is in G. Specifically, v.pmarke(u)[s].cpre stores predecessors of node (v, s) in GI that are on a path starting from (u, s0). In addition, (v', s') is in v.pmarke(u)[s].mpre when v'.pmarke(u)[s'].dist+1=v.pmarke[s].dist. Specifically, mpre keeps track of those predecessors on shortest paths. Such information may be referred to as auxiliary information, and may be determined by RPQNFA without increasing the algorithms corresponding complexity.

In this example, AFF is the difference between G(RPQNFA,Q) and (G⊕ΔG)(RPQNFA,Q), as changes to the markings. The markings are the data that RPQNFA inspects, since updates to markings trigger different behaviors of RPQNFA when computing Q(G⊕ΔG) and Q(G). For instance, a change to dist in v.pmarke(u)[s] indicates that (v, s) is reached in a breadth first search (BFS) through a different path from (u, s0). Also, state s is included in v.pmark(u) in RPQNFA at a different level of the BFS tree.

Based on markings, an incremental algorithm that is bounded relative to RPQNFA is denoted as IncRPQ and is discussed below. The boundedness for IncRPQ is accomplished by updating markings only when there exists a corresponding difference between the data inspected by RPQNFA. For unit edge deletions and insertions, the IncRPQ is similar to counterparts for KWS, as discussed above, as IncRPQ is guided by changes to dist. While IncRPQ is presented for batch updates, a IncRPQ can be altered, according to the principles of IncKWS+ and/or IncKWS− to operate on edge insertions/edge deletions.

The IncRPQ algorithm may be employed to generate NFA 500 from an RPQ query, traverse graph 300 with the NFA 500, generate the corresponding intersection graph 600, and employ the NFA 500 and intersection graph 600 to output a result of the RPQ query based on changes to the graph 300 without applying the RPQ query to the entire graph 300. The IncRPQ algorithm receives a graph G with pmarke(•), a regular path query Q, a NFA MQ, matches Q(G), and batch updates (ΔG+,ΔG−) as inputs. The IncRPQ algorithm outputs the updated matches Q(G⊕ΔG) and markings pmarke (•). IncRPQ is as follows:

```
1.  set affs := identAff(G, pmarke(•),ΔG−); queue q := nil;
2.  for each (v, u, s) in affs do
3.      update dist, mpre for v.pmarke(u)[s] based on its cpre;
4.      q.insert((v, u, s), v.pmarke(u)[s].dist);
5.  for each edge insertion of (v,w) in ΔG+ do
6.      if edge (v,w) leads to a smaller w.pmarke(u)[s].dist for
            node u and
            state s and (v, u, s) is not in affs then
7.          update dist, mpre, cpre for w.pmarke(u)[s];
8.          q.insert((w, u, s),w.pmarke(u)[s].dist);
9.  update pmarke(•) based on queue q and NFA MQ;
10. update Q(G) to get Q(G ⊕ΔG);
11. return Q(G ⊕ΔG) and pmarke(•);
```

IncRPQ, as detailed above, first invokes procedure identAff to identify a set affs of (v, u, s) triples, where v.pmarke(u)[s].dist is no longer valid due to edge deletions (line 1). This is similar to IncKWS− mechanism, which identifies affected entries of keyword-distance lists. Accordingly, identAff checks the values of mpre and cpre in markings. For example, when v.pmarke(u)[s].mpre becomes empty, identAff checks whether (v, s) is in v'.pmarke(u)[s'].mpre for each successor v' of v and s'∈δ(s, l(v')). If so, (v, s) is removed, and identAff continues to check the successors of v'. IncRPQ then updates the corresponding (potential) dist values of triples in affs based on the current cpre. This includes the remaining candidate predecessors after removing affected entries. These triples with dist values are inserted into priority queue q (lines 2-4) for deciding exact markings later on. Thereafter, IncRPQ processes insertions in ΔG+ by checking whether they yield smaller dist values in some markings (lines 5-6). IncRPQ then updates such dist values accordingly (line 7). The updated triples are added to queue q (line 8). IncRPQ determines exact markings based on queue q (line 9) following a monotonically increasing order of updated dist, while NFA MQ is used to guide the propagation. By grouping updated triples in queue q, the algorithm reduces redundant computations when processing ΔG. Finally, given the updated markings, Q(G⊕ΔG) is determined by taking pairs of nodes marked with accepting states in F and removing invalid pairs of nodes from Q(G) (line 10).

As discussed above, example batch updates ΔG to G may cause the deletion of ((c2, s1), (b3, s2)) and insertion of ((b2, s2), (a1, s1)) to the intersection graph 600 GI. IncRPQ finds that triple (b3, c2, s2) is affected by the deletion. The change is propagated to the decedents of (b3, s2) in GI, and potential values of <dist,mpre> for affected entries are computed. IncRPQ the decides exact values after processing insertions. Examples of such updates are shown in Table 3 below.

TABLE 3

| IncRPQ | Before Updates | After Updates |
|---|---|---|
| b3.pmarke(c2)[s2] | <2, {(c2, s1)}> | <⊥, nil> |
| a2.pmarke(c2)[s1] | <3, {(b3, s2)}> | <⊥, nil> |
| c2.pmarke(c2)[s3] | <4, {(a2, s1)}> | <5, {(c1, s1)}> |
| c1.pmarke(c2)[s3] | <⊥, nil> | <4, {(a1, s1)}> |
| c1.pmarke(c1)[s3] | <⊥, nil> | <5, {(a1, s1)}> |

As shown above, although the previous path from (c2, s0) to (c2, s3) is split, the accepting state s3 of NFA 500 remains in marking c2.pmarke(c2) since another path connecting these two nodes in GI is formed as a result of the insertions. IncRPQ combines the processes for delete(c2, b3) and insert(b2, a1) to compute exact value of c2.pmarke(c2)[s3]. Based on these graph changes, IncRPQ adds (c2, c1) and (c1, c1) to obtain Q(G⊕ΔG), as accepting state s3 is included in the corresponding markings.

IncRPQ operates in O(|AFF| log |AFF|) time. Specifically, affected triples are added to set affs and queue q at most once by BFS traversal. Further, each of procedure identAff (line 1), computing potential values (lines 2-4) and processing edge insertions (lines 5-8) takes O(|AFF|) time by using MQ and cpre. To compute potential values, O(|AFF|) predecessors are processed directly via cpre, without inspecting the entire neighbors. Also, computing the latest values of markings (line 9) employs O(|AFF| log |AFF|) time by using heaps for queue q, in a manner similar to adjusting dist values for affected nodes in IncKWS. In addition, |Q| is counted in |AFF|. All these steps have time/resource costs bounded by a function of |AFF|. Hence IncRPQ is bounded relative to RPQNFA.

The following relates to an incremental algorithm for SCC based queries. As discussed above, a SCC query computes the set of all strongly connected components in a given a graph G. A strongly connected component is referred to herein as a scc. In order to perform SCC queries, Tarjan's algorithm is incrementalized herein below. As used herein the Tarjan batch algorithm is referred to as Tarjan. Tarjan traverses a directed graph G via DFS to generate a spanning forest F. The spanning forest F is generated such that each scc corresponds to a subtree of a tree T in F with a designated root. Tarjan reduces SCC to finding the roots of corresponding subtrees in F. More specifically, each node v in G is assigned a unique integer v.num, denoting the order of v visited in the traversal. The edges of G fall into various classes by DFS. A first class includes tree arcs that lead to nodes not yet discovered during the traversal. A second class includes fronds that run from descendants to their ancestors in a tree. A third class includes reverse fronds that are from ancestors to descendants in a tree. A fourth class includes cross-links that run from one subtree to another. In addition, v.lowlink is maintained, which represents the smallest num of the node that is in the same scc as v and is reachable by traversing zero or more tree arcs followed by at most one frond or cross-link. Tarjan determines whether v is the root of the subtree corresponding to an scc by checking whether v.lowlink=v.num. Tarjan may then generate the scc accordingly. Also, Tarjan uses a stack to store nodes that have been reached during DFS but have not been placed in an scc. A node remains on the stack if and only if there exists a path in G from it to some node earlier on the stack.

Figure 7:
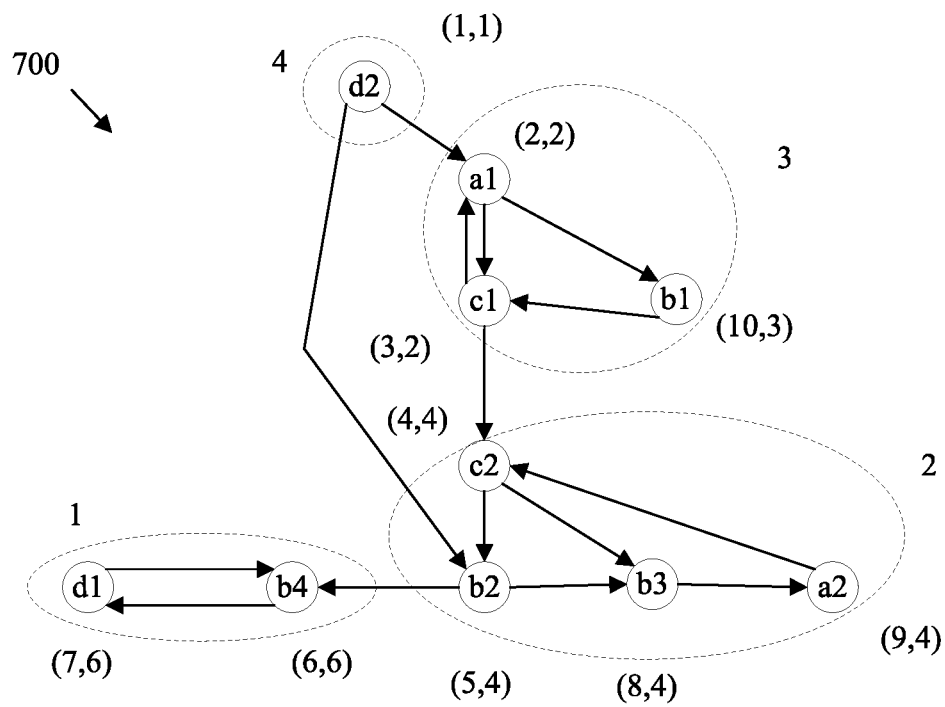
FIG. 7 is a schematic diagram of an example depth first search (DFS) forest of a dataset graph.

FIG. 7 is a schematic diagram of an example DFS forest 700 of a dataset graph. A DFS forest 700 is a group of search trees that are related by a common search. Specifically, DFS forest 700 is a DF forest F obtained by applying Tarjan on graph G such as graph 300. Each node in DF forest 700 is annotated with a corresponding (num, lowlink), where num indicates an order that a node is discovered by the Tarjan algorithm and lowlink indicates a smallest index of any known node reachable from the present node via the present nodes DFS subtree (including the present node). In this example, four scc's (DFS subtrees) are depicted as dotted circles surrounding one or more nodes.

Figure 8:
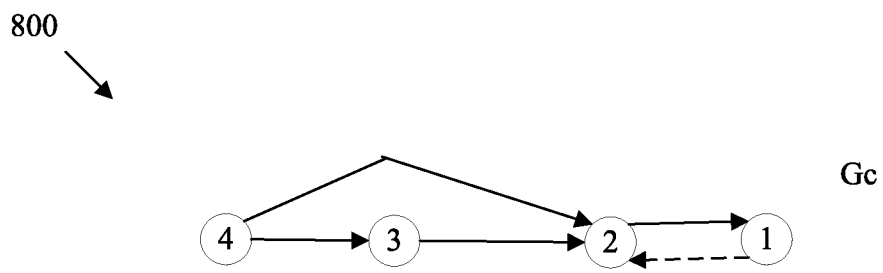
FIG. 8 is a schematic diagram of example DFS based contracted graphs.
Figure 8:
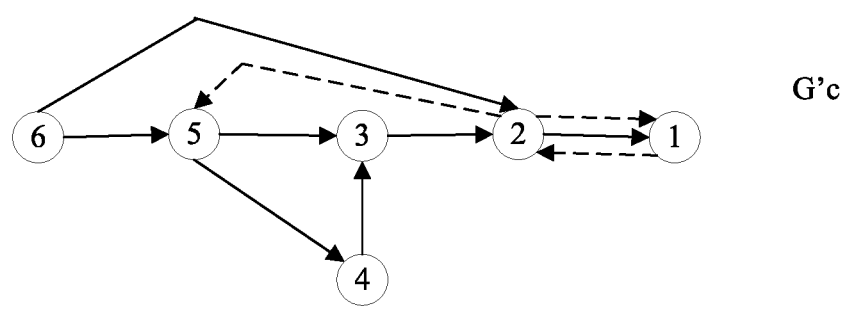

FIG. 8 is a schematic diagram of example DFS based contracted graphs 800. The contracted graphs 800 are denoted as Gc and G'c. Specifically, contracted graph 800 Gc includes nodes labeled 1-4 that correspond to the sccs labeled 1-4, respectively, in the DFS forest 700. Such nodes in contracted graph 800 Gc are connected by solid lines indicating the connectivity between sccs as shown in DFS forest 700. The dotted line is a result of an insert graph update. Further, G'c is obtained from Gc based on a graph update by an incremental SCC algorithm as discussed below.

To incrementalize Tarjan, the values of num and lowlink are maintained after traversing G. Further, the edges are annotated with the type that they fall into. Specifically, the contracted graph 800 Gc is constructed by contracting each scc into a single node. The graph Gc maintains a counter for the number of cross-links from one node to another. Each node v in Gc has a topological rank r(v) initially set to the order of the scc to which v corresponds in the output sequence of Tarjan. The topological sorting of scc's is a byproduct of Tarjan as nodes of each scc are popped from the stack recursively. These can be obtained by slightly revising Tarjan without increasing the complexity or changing the logic. For example, r(v)>r(v') when (v, v') is a cross-link in Gc, which is an invariant property employed in the incremtalization algorithm disclosed below.

The affected area AFF includes changes to lowlink and num of nodes when computing SCC(G⊕ΔG). This is because accurate lowlink and num values determine the correctness of Tarjan. The AFF also includes v's successors for each node v whose v.lowlink changes. This is because the lowlink value of v is determined by comparing with the lowlink or num of vs successors. The AFF also includes the neighbors of v for each node v whose v.num changes. This is because these neighbors are affected in this case and are necessarily checked by Tarjan.

Based on the foregoing, a bounded incremental algorithm is described relative to Tarjan. This algorithm operates under unit insertions, deletions, and batch updates. Inserting an edge may result in combining two or more scc's into a single scc. This happens if and only if a cycle is formed with the corresponding nodes of these scc's in the contracted graph after the insertion. By employing the contracted graph 800 Gc, an incremental algorithm IncSCC+ is disclosed.

The IncSCC+ algorithm may be employed to generate a DFS forest 700 of a dataset graph 300 by applying an SCC query. IncSCC+ may also generate corresponding contracted graphs 800 from the DFS forest 700. Inc SCC+ may then accept changes to graph 300, update the DFS forest 700 and/or the contracted graphs 800, and output a result of the SCC query based on changes to the graph 300 without reapplying the SCC query to the entire graph 300. IncSCC+ receives a graph G with num(•) and lowlink(•), a contracted graph Gc, an SCC(G) and an edge (v, w) to be inserted as input. IncSCC+ then outputs SCC(G⊕ΔG) and an updated num(•), lowlink(•) and Gc. IncSCC+ is as follows:

```
1.  if v and w are within the same scc (tree) T then
2.      T := T __ _G; update num(•), lowlink(•) for T;
3.  if r(scc(v)) > r(scc(w)) then update Gc;
4.  if r(scc(v)) < r(scc(w)) then
5.      affr := DFSf (Gc,w, r(scc(v))); affl := DFSb(Gc, v, r(scc(w)));
6.      if Tarjan(affl [ affr , v) has non-singleton cycle C then
7.          merge the corresponding components of nodes in C;
8.          update num(•), lowlink(•) for the new component;
9.      else reallocRank(affl, affr);
10. return SCC(G __ _G) and updated num(•), lowlink(•), and Gc;
```

IncSCC+ is employed to process unit insertion of edge (v,w). IncSCC+ checks whether (v,w) causes a cycle in Gc, and combines some of the scc's in SCC(G) as desired to obtain SCC(G⊕ΔG). IncSCC+ separates different types of (v,w), and makes use of topological ranks based on the invariant property mentioned above. Relatively boundedness is guaranteed since every change to the rank of an scc inspected by algorithm IncSCC+ corresponds to a change of lowlink or num, and thus is in AFF.

More specifically, if v and w are within the same scc T, then nothing changes for the other scc's. In this case, IncSCC+ only applies ΔG to T and computes the changes to num and lowlink, by applying Tarjan on the changed parts (lines 1-2). Otherwise the topological ranks of scc(v) and scc(w) in Gc are considered, where scc(v) (resp. scc(w)) refers to the corresponding scc node to which v (resp. w) belongs. When r(scc(v))>r(scc(w)), no new scc is generated. IncSCC+ only updates the graph Gc by inserting edge (scc(v), scc(w)) or increasing the counter of edges connecting their corresponding scc's (line 3). As the order of topological ranks in Gc is not affected in this case, IncSCC+ concludes that graph Gc is still acyclic and SCC(G⊕ΔG) =SCC(G).

When r(scc(w))>r(scc(v)), the order of these two ranks becomes incorrect. IncSCC+ identifies the affected area affl and affr, which are two subgraphs of Gc induced by nodes whose ranks are no longer valid. IncSCC+ identifies the affected areas through a bi-directional search. IncSCC+ invokes a procedure denoted as $DFS_f$ to conduct a forward DFS traversal from w to find nodes with topological ranks greater than that of v. IncSCC+ also invokes a backward DFS traversal, denoted as $DFS_b$, from v to find nodes having ranks less than that of w (lines 4-5). When a cycle C is formed in the affected area, the corresponding scc's of the nodes in C are merged into one to obtain SCC(G⊕ΔG). IncSCC+ updates num and lowlink values in the new scc (lines 6-8). Otherwise, although the output is unaffected, IncSCC+ reallocates the topological ranks of nodes in the affected area such that r(v)>r(v') when (v, v') is in Gc. A procedure reallocRank is employed to perform this task (line 9). This ensures that the relationship of topological ranks still holds. The procedure reallocRank sorts the previous ranks of those nodes in affl and affr, and reassigns them in an ascending order, e.g., first affr and then affl. For example, nodes in affr may have lower ranks than those in affl due to the edge insertion.

As a particular example, an edge e4=(b4, b3) may be inserted into graph 300 G as part of a graph update. This creates a dotted edge between b4 (scc 1) and b3 (scc 2) in DFS forest 700. This results in a dotted edge being added between node one and node two in contracted graph 800 $G_c$. Specifically, the topological ranks r(scc(b4))<r(scc(b3)) in Gc. Thus IncSCC+ identifies the affected area that includes nodes one and two and forms a cycle. Then scc1 and scc2 are merged to obtain the output SCC(G⊕ΔG).

The correctness of IncSCC+ is warranted by several properties. Scc's are merged in response to an edge insertion if and only if they form a cycle in the contracted graph. Further, the topological ranks of the nodes on any path in Gc decrease monotonically. Regarding complexity, IncSCC+ is in O(|AFF| log |AFF|) time. The resource/time cost for updating lowlink and num by Tarjan on the affected parts is O(|AFF|). Besides this, IncSCC+ only visits those nodes in the contracted graph with updated ranks, and their neighbors. The number of nodes visited does not exceed |AFF| since there must be changes to num and lowlink in the scc's that they refer to. Cycle detection is done in O(|AFF|) time and rank reallocation takes O(|AFF| log |AFF|) time via sorting by using heaps. Hence, IncSCC+ is bounded relative to Tarjan.

An incremental deletion algorithm for SCC, denoted as IncSCC−, may also be employed. Specifically, when an edge (v,w) is deleted from G, an scc may be split into multiple sccs. However, the output is unchanged if v still reaches w after the deletion. IncSCC– is similar to IncSCC+. IncSCC– examines the reachability from v to w by using num and lowlink maintained. IncSCC– also computes new scc's in $SCC(G \oplus \Delta G)$ when v no longer reaches w in the same scc. The reachability checking is done as a byproduct of change propagation to num and lowlink, from which relatively boundedness is obtained.

An incremental batch algorithm for SCC, denoted as IncSCC, may also be employed. Hence, IncSCC is employed to process $\Delta G=(\Delta G+,\Delta G-)$. IncSCC handles multiple updates in groups instead of one by one, to reduce redundant cost. IncSCC includes two steps. IncSCC first processes intra-component updates, where the endpoints of an updated edge are in the same scc. Updates to the same scc are grouped and processed together. IncSCC may start with edge insertions, and may adjust values of num and lowlink in a manner similar to IncSCC+. Inserted edges may then be processed following a descending order determined by the num values of their source nodes. Following the same processing order, IncSCC– is invoked to handle deletions grouped together. This mitigates redundant updates to num and lowlink values. After these, Tarjan is called on the affected scc's at most once to generate new scc's in SCC(G (D$\Delta$G). IncSCC then handles inter-component updates. These include edge updates in which the endpoints fall in different scc's. After updating Gc with deletions, forward and backward traversals are performed to find the affected areas for the intercomponent insertions in a manner similar to IncSCC+. However, IncSCC stores these areas in a global structure aff, and checks the existence of cycles formed by nodes from this global affected area. This is performed instead of processing unit updates one by one. Components are merged, and num(•) and lowlink(•) are revised along the same lines as IncSCC+ to obtain $SCC(G \oplus \Delta G)$. Topological ranks are reallocated as desired, and $SCC(G \oplus \Delta G)$ is returned.

As an example, batch updates $\Delta G$ may be applied to graph 300. The batch updates include inserting edges e1, e3, and e4, and deleting edges e2 and e5. The intra-component deletions of e2 and e5 may be handled first by IncSCC. Since e2=(c2, b3) is a reverse frond in scc2, IncSCC just deletes e2 from scc2. Edge e5=(c1, a1) from graph 300 G is a frond in scc3. The lowlink value of c1 increases to 3 and equals the corresponding num after deletion. Hence, procedure chkReach concludes that c1 no longer reaches root a1 of scc3. Accordingly, IncSCC– computes new scc's on affected scc3 to update the output. Accordingly, scc3 is split into three components, which are depicted as nodes 3-5 in contracted graphs 800 G'c. As such, the batch updates converts Gc into G'c. Once the deletions have been completed, the remaining inter-component insertions in $\Delta G$ are completed by retrieving the affected area on contracted graph G'c. Nodes 1 to 5 are covered by affected area aff that constitutes an scc in G'c. Hence the previous scc's in SCC(G) except scc4 (d2) are merged to obtain $SCC(G \oplus \Delta G)$ in IncSCC.

The correctness of IncSCC follows from the correctness of IncSCC+ and IncSCC–. Regarding complexity, IncSCC takes $O(|AFF|(\Delta G|+\log |AFF|))$ time. Processing intra-component updates takes $O(|\Delta G||AFF|)$ time since each update to the auxiliary structures in AFF is checked at most $|\Delta G|$ times. Further, completing inter-component updates takes $O(|\Delta G||AFF|+|AFF| \log |AFF|)$ time, where each node with updated ranks in Gc is accessed by at most $|\Delta G|$ different bi-directional searches. The time for final rank reallocation is in $O(|AFF| \log |AFF|)$ as such nodes are collected in aff. Thus IncSCC is bounded relative to Tarjan.

Various experiments with the incremental algorithms for KWS, ISO RPQ, SCC as discussed above have also been performed. Such experiments show that incremental algorithms, either localizable or relatively bounded, are more effective than their batch counterparts in response to updates. When $|\Delta G|$ varies from 5% to 20% of $|G|$ for the three full-size graphs G, IncKWS, IncRPQ, IncSCC and IncISO outperform corresponding non-incremental batch algorithms from 6.9 to 2.4 times, 11.6 to 2.8 times, 3.4 to 1.7 times, and 7.9 to 2 times on average, respectively. The incremental algorithms outperform the batch algorithms even when $|\Delta G|$ is up to 30%, 35%, 25% and 25% of $|G|$, respectively. Further, incremental algorithms scale well with $|G|$ and are feasible on real-life graphs when $\Delta G$ is small, as generally occurs in big datsets. For instance, IncKWS, IncRPQ, IncSCC and IncISO take 9, 42, 7 and 113 seconds, respectively, when updates account for 5% of an example graph, as opposed to 62, 355, 54 and 427 seconds by their batch counterparts. Based on the foregoing, the incremental algorithms disclosed herein effectively improve the performance of batch updates by 1.6 times on average.

The forgoing shows that incremental graph computations can be completed when graph updates are localizable and/or relatively bounded. Specifically, incremental updates for RPQ, SCC, KWS, and ISO are unbounded. However, RPQ, SCC, KWS, and ISO are either localizable or bounded relative to their batch counterparts. Accordingly, the disclosed incremental algorithms provide corresponding performance guarantees. Experimental results have verified that the incremental algorithms substantially outperform their batch counterparts and scale well with large graphs.

Figure 9:
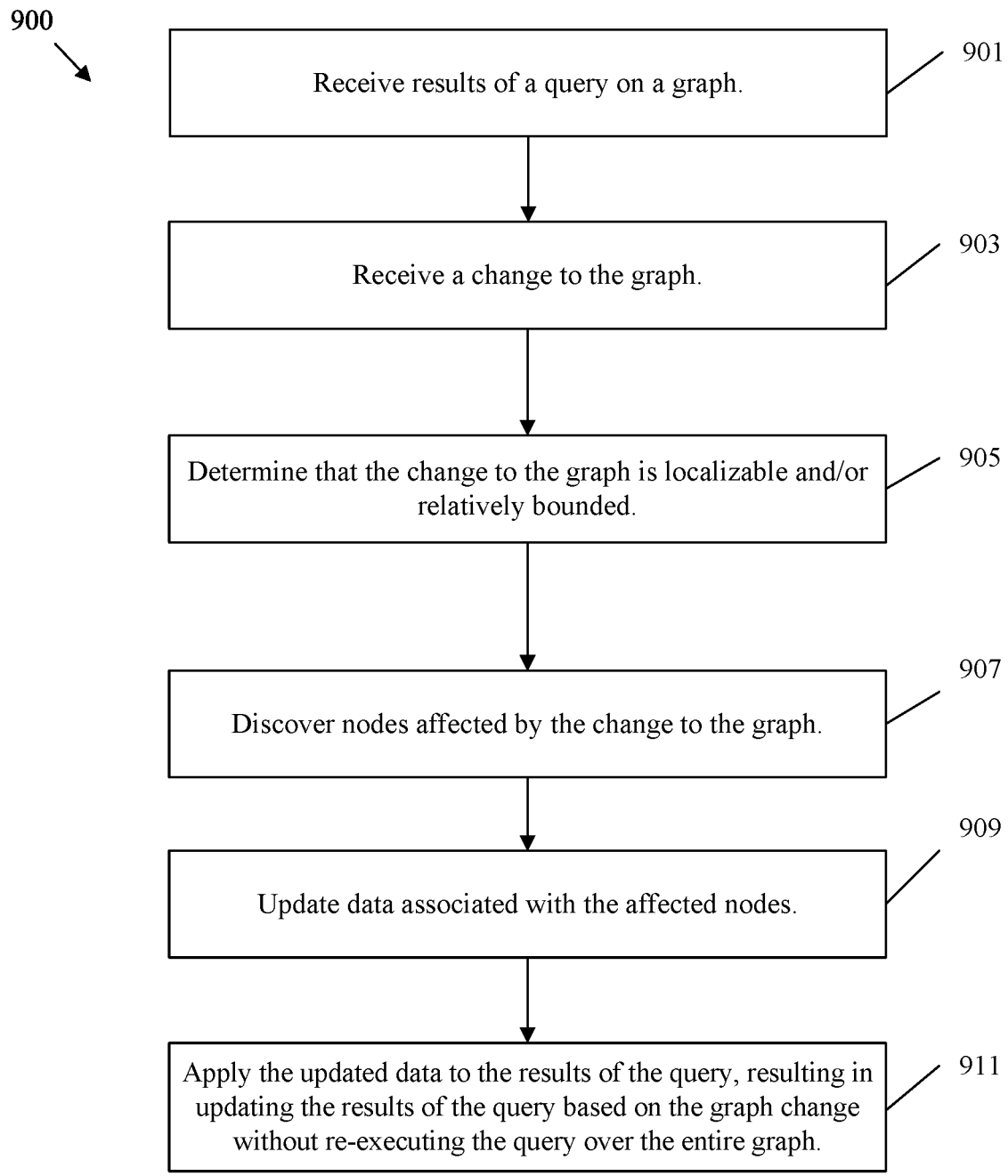
FIG. 9 is a flowchart of an example method of incremental graph determination.

FIG. 9 is a flowchart of an example method 900 of incremental graph determination. For example, method 900 may be employed by a computing device, such as computing device 200 to update results of a query, such as query 101, after receiving updates to dataset stored as a graph, such as changes 105, without rerunning the query over the entire graph. As discussed hereinabove, this approach may allow for significant reductions in time costs when the updates to the graph are small relative to the size of the graph.

The method 900 initiates after a search query has been employed to search a dataset stored in graph form and an update to the graph is initiated. As discussed hereinabove, the query may be a KWS query, an ISO query, an RPQ query, or an SCC query. At block 901, the initial results of the query on the graph linking the data in the dataset are received. For example, the results may be stored in memory after the search query searched in the dataset prior to initiation of method 900. Accordingly, the results can be received from memory.

At block 903, a change to the graph is received. The change to the graph may be an edge insertion or deletion, which indicates a change in the relationship between data nodes. The change to the graph may also include a batch change that makes multiple insertions and deletions, depending on the example.

At block 905, the method 900 determines that the change to the graph is localizable and/or relatively bounded. The change to the graph is localizable when the change to the graph can be determined by inspecting only graph nodes within a specified number of hops of any graph node indicated by the received change to the graph. The change to the graph is relatively bounded when a cost of an incremental change is expressed as a polynomial function in terms of the change to the graph, a query size, and a change in the affected area of the query caused by the change to the graph. The change to the graph is generally localizable when the query is a KWS query or a pattern matching query via ISO. The change to the graph is generally relatively bounded when the query is a regular path query (RPQ) or a search of strongly connected components (SCC). Further, a bound may be received from a user or may be predefined to ensure the query is relatively bounded. Based on the determination that the change is a localizable or relatively bounded change to the graph, the method 900 proceeds to block 907.

At block 907, the method 900 discovers nodes that are affected by the change to the graph. For example, nodes adjacent to and/or nodes including insertions/deletions may include data that is affected by the corresponding change. Further, nodes connected to such nodes may also be affected by the change. Accordingly, the query can be applied to each adjacent node and predecessor/successor nodes until nodes are reached that are not affected by the change. In some examples, the affected nodes are stored in queues.

At block 909, data associated with the affected nodes is updated. For example, the query can be employed to search the affected nodes. Also, in some cases a NFA can be applied to the affected nodes. Updating the data of the affected nodes results in updated results, such as change in output 107.

At block 911, the updated data is applied to the initial results of the query as stored in memory. Specifically, only entries in the initial results that are affected by the updated data are modified or reviewed. Accordingly, the results of the query are updated based on the change to the graph without determining updated results of the query over the entire graph. Specifically, the incremental updating procedure runs at a time cost that is a function of the size of the update and not a function of the size of the underlying graph and corresponding dataset.

Blocks 907, 909, and 911 are general descriptions of the algorithms IncKWS, IncKWS+, IncKWS−, IncISO, IncRPQ, IncSCC, IncSCC+, and/or IncSCC− as described in detail in the sections above. Accordingly, blocks 907, 909, and 911 can be customized based on the query and corresponding incremental algorithm employed. For example, when the query is a KWS query, updating the results of the query may include determining when the change to the graph alters a shortest path for a query match, propagating the change to each altered shortest path within a specified bound, updating a distance value for a corresponding node for each altered shortest path, and updating the query match based on the updated distance values. In such a case, updating the results may also include identifying graph nodes affected with respect to each keyword due to the change to the graph within a specified bound of the change, inserting the affected graph nodes into a queue based on keyword and potential distance values, determining when any graph node insertion into the queue creates a shorter path within the bound and update potential distance values in the queue, and updating the results of the query based on the queue.

As another example, when the query is a pattern matching via ISO, updating the results of the query may include determining a set of all edge deletions and edge insertions by the change to the graph, for each edge deletion, removing matches including the corresponding deleted edge by inspecting neighbor graph nodes of graph nodes on the deleted edge within a diameter of the query, for each edge insertion, extracting a union of neighbor graph nodes of graph nodes on the inserted edge within a diameter of the query, and determining the change to the query results based on edge changes.

As another example, when the query is an RPQ query, updating the results of the query may include receiving an NFA describing the query, examining nodes adjacent to edges included in the change to the graph, placing nodes affected by the change to the graph into a queue, and applying the NFA to the nodes in the queue to update results of the query.

As another example, when the query is an SCC query, updating the results of the query may include determining a contracted graph containing a node for each SCC in the results of the query, when the change to the graph includes an insertion, updating only nodes corresponding to SCCs including a portion of the insertion resulting in an updated contracted graph, when the change to the graph includes a deletion, updating only nodes corresponding to SCCs including a portion of the deletion resulting in the updated contracted graph, and employing the updated contracted graph to update the results of the query.

A network device comprising: a memory means configured to: store results of a query on a graph linking data, and store a change to the graph; and a processing means to: determine that the change to the graph is localizable or relatively bounded; and based on the determination of the localizable or relatively bounded change to the graph, update the results of the query based on the change to the graph without determining updated results of the query over the graph by: discovering nodes that are affected by the change to the graph, updating data associated with the affected nodes, and applying the updated data to the results of the query.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:
1. A computer implemented method comprising:
receiving results of a query on a graph wherein the graph comprises linked data;
receiving a change to the graph;
determining that the change to the graph is localizable when the change to the graph can be determined by inspecting only graph nodes within a specified number of hops of any graph node indicated by the change to the graph;

determining that the change to the graph is relatively bounded when a cost of an incremental change is expressed as a polynomial function in terms of the change to the graph, a query size, and a change in an affected area of the query caused by the change to the graph; and updating the results of the query based on the change to the graph without determining updated results of the query over the graph when the change to the graph is localizable and relatively bounded, the updating performed by:

discovering affected nodes that are affected by the change to the graph, updating data associated with the affected nodes resulting in updated data, and applying the updated data to the results of the query.

2. The computer implemented method of claim 1, wherein the query is a key word search (KWS), pattern matching via subgraph isomorphism (ISO), or combinations thereof.

3. The computer implemented method of claim 1, wherein the query is a key word search (KWS), and updating the results of the query includes:

determining when the change to the graph alters a shortest path for a query match;

propagating the change to each altered shortest path within a specified bound;

updating a distance value for a corresponding node for each altered shortest path resulting in updated distance values; and updating the query match based on the updated distance values.

4. The computer implemented method of claim 1, wherein the query is a key word search (KWS), and updating the results of the query includes:

identifying affected graph nodes affected with respect to each keyword due to the change to the graph within a specified bound of the change;

inserting the affected graph nodes into a queue based on keyword and potential distance values;

determining when any graph node insertion into the queue creates a shorter path within the specified bound and update potential distance values in the queue; and updating the results of the query based on the queue.

5. The computer implemented method of claim 1, wherein the query is a pattern matching via subgraph isomorphism (ISO), and updating the results of the query includes:

determining a set of all edge deletions and edge insertions by the change to the graph;

for each edge deletion, removing matches including a corresponding deleted edge by inspecting neighbor graph nodes of graph nodes on the deleted edge within a diameter of the query;

for each edge insertion, extracting a union of neighbor graph nodes of graph nodes on the inserted edge within the diameter of the query; and determining the change to the results of the query based on edge changes.

6. The computer implemented method of claim 1, wherein the query is a regular path query (RPQ), a search of strongly connected components (SCC), or combinations thereof.

7. The computer implemented method of claim 1, wherein the query is a regular path query (RPQ), and updating the results of the query includes:

receiving a nondeterministic finite automaton (NFA) describing the query;

examining nodes adjacent to edges included in the change to the graph;

placing nodes affected by the change to the graph into a queue; and applying the NFA to the nodes in the queue to update results of the query.

8. The computer implemented method of claim 1, wherein the query is a search of strongly connected components (SCC), and updating the results of the query includes:

determining a contracted graph containing a node for each SCC in the results of the query;

when the change to the graph includes an insertion, updating only nodes corresponding to SCCs including a portion of the insertion resulting in a updated contracted graph;

when the change to the graph includes a deletion, updating only nodes corresponding to SCCs including a portion of the deletion resulting in the updated contracted graph; and employing the updated contracted graph to update the results of the query.

9. A network device comprising:

a memory comprising results of a query on a graph linking data, a change to the graph, and instructions; and one or more processors in communication with the memory, wherein the one or more processors execute the instructions to:

determine that the change to the graph is localizable when the change to the graph can be determined by inspecting only graph nodes within a specified number of hops of any graph node indicated by the change to the graph;

determine that the change to the graph is relatively bounded when a cost of an incremental change is expressed as a polynomial function in terms of the change to the graph, a query size, and a change in an affected area of the query caused by the change to the graph; and update the results of the query based on the change to the graph without determining updated results of the query over the graph when the change to the graph is localizable and relatively bounded, the updating performed by:

discovering affected nodes that are affected by the change to the graph, updating data associated with the affected nodes resulting in updated data, and applying the updated data to the results of the query.

10. The network device of claim 9, wherein the query is a key word search (KWS), and updating the results of the query includes:

determining when the change to the graph alters a shortest path for a query match;

propagating the change to each altered shortest path within a specified bound;

updating a distance value for a corresponding node for each altered shortest path resulting in updated distance values; and updating the query match based on the updated distance values.

11. The network device of claim 9, wherein the query is a key word search (KWS), and updating the results of the query includes:

identifying affected graph nodes affected with respect to each keyword due to the change to the graph within a specified bound of the change;

inserting the affected graph nodes into a queue based on keyword and potential distance values;

determining when any graph node insertion into the queue creates a shorter path within the specified bound and update potential distance values in the queue; and updating the results of the query based on the queue.

12. The network device of claim 9, wherein the query is a pattern matching via subgraph isomorphism (ISO), and updating the results of the query includes:

determining a set of all edge deletions and edge insertions by the change to the graph;

for each edge deletion, removing matches including a corresponding deleted edge by inspecting neighbor graph nodes of graph nodes on the deleted edge within a diameter of the query;

for each edge insertion, extracting a union of neighbor graph nodes of graph nodes on the inserted edge within the diameter of the query; and determining the change to the results of the query based on edge changes.

13. The network device of claim 9, wherein the query is a regular path query (RPQ), and updating the results of the query includes:

receiving a nondeterministic finite automaton (NFA) describing the query;

examining nodes adjacent to edges included in the change to the graph;

placing nodes affected by the change to the graph into a queue; and applying the NFA to the nodes in the queue to update results of the query.

14. The network device of claim 9, wherein the query is a search of strongly connected components (SCC), and updating the results of the query includes:

determining a contracted graph containing a node for each SCC in the results of the query;

when the change to the graph includes an insertion, updating only nodes corresponding to SCCs including a portion of the insertion resulting in a updated contracted graph;

when the change to the graph includes a deletion, updating only nodes corresponding to SCCs including a portion of the deletion resulting in the updated contracted graph; and employing the updated contracted graph to update the results of the query.

15. A non-transitory computer readable medium comprising a computer program product for use by a network device, the computer program product comprising computer executable instructions stored on the non-transitory computer readable medium such that when executed by a processor cause the network device to:

receive results of a query on a graph linking data;

receive a change to the graph;

determine that the change to the graph is localizable-when the change to the graph can be determined by inspecting only graph nodes within a specified number of hops of any graph node indicated by the change to the graph;

determine that the change to the graph is relatively bounded when a cost of an incremental change is expressed as a polynomial function in terms of the change to the graph, a query size, and a change in an affected area of the query caused by the change to the graph; and update, by the processor, the results of the query based on the change to the graph without determining updated results of the query over the graph when the change to the graph is localizable and relatively bounded, the updating performed by:

discovering affected nodes that are affected by the change to the graph, updating data associated with the affected nodes resulting in updated data, and applying the updated data to the results of the query.

16. The non-transitory computer readable medium of claim 15, wherein the query is a key word search (KWS), and updating the results of the query includes:

determining when the change to the graph alters a shortest path for a query match;

propagating the change to each altered shortest path within a specified bound;

updating a distance value for a corresponding node for each altered shortest path resulting in updated distance values; and updating the query match based on the updated distance values.

17. The non-transitory computer readable medium of claim 15, wherein the query is a key word search (KWS), and updating the results of the query includes:

identifying affected graph nodes affected with respect to each keyword due to the change to the graph within a specified bound of the change;

inserting the affected graph nodes into a queue based on keyword and potential distance values;

determining when any graph node insertion into the queue creates a shorter path within the specified bound and update potential distance values in the queue; and updating the results of the query based on the queue.

18. The non-transitory computer readable medium of claim 15, wherein the query is a pattern matching via subgraph isomorphism (ISO), and updating the results of the query includes:

determining a set of all edge deletions and edge insertions by the change to the graph;

for each edge deletion, removing matches including a corresponding deleted edge by inspecting neighbor graph nodes of graph nodes on the deleted edge within a diameter of the query;

for each edge insertion, extracting a union of neighbor graph nodes of graph nodes on the inserted edge within the diameter of the query; and determining the change to the results of the query based on edge changes.

19. The non-transitory computer readable medium of claim 15, wherein the query is a regular path query (RPQ), and updating the results of the query includes:

receiving a nondeterministic finite automaton (NFA) describing the query;

examining nodes adjacent to edges included in the change to the graph;

placing nodes affected by the change to the graph into a queue; and applying the NFA to the nodes in the queue to update results of the query.

20. The non-transitory computer readable medium of claim 15, wherein the query is a search of strongly connected components (SCC), and updating the results of the query includes:

determining a contracted graph containing a node for each SCC in the results of the query;

when the change to the graph includes an insertion, updating only nodes corresponding to SCCs including a portion of the insertion resulting in a updated contracted graph;

when the change to the graph includes a deletion, updating only nodes corresponding to SCCs including a portion of the deletion resulting in the updated contracted graph; and employing the updated contracted graph to update the results of the query.

* * * * *